(12) United States Patent
Suda et al.

(10) Patent No.: US 7,120,641 B2
(45) Date of Patent: Oct. 10, 2006

(54) APPARATUS AND METHOD FOR EXTRACTING DATA

(75) Inventors: Aruna Rohra Suda, Yokohama (JP); Suresh Jeyachandran, Yokohama (JP); Prem Anand Joseph, Yokohama (JP)

(73) Assignee: Saora Kabushiki Kaisha, Yokohama (JP)

( * ) Notice: Subject to any disclaimer, the term of this patent is extended or adjusted under 35 U.S.C. 154(b) by 257 days.

(21) Appl. No.: 10/117,514

(22) Filed: Apr. 5, 2002

(65) Prior Publication Data

US 2005/0033715 A1    Feb. 10, 2005

(51) Int. Cl.
*G06F 17/00* (2006.01)
*G06F 7/00* (2006.01)

(52) U.S. Cl. ............ 707/102; 707/101; 707/104.1; 707/10; 715/968

(58) Field of Classification Search ............ 707/104.1, 707/102, 101, 1, 10; 715/968
See application file for complete search history.

(56) References Cited

U.S. PATENT DOCUMENTS

| | | | |
|---|---|---|---|
| 4,633,393 A | 12/1986 | Rundell | |
| 5,371,844 A * | 12/1994 | Andrew et al. | ............ 715/747 |
| 5,678,041 A | 10/1997 | Baker et al. | |
| 5,828,374 A | 10/1998 | Coleman et al. | |
| 5,835,712 A | 11/1998 | DuFresne | |
| 5,848,410 A | 12/1998 | Walls et al. | |
| 5,892,908 A | 4/1999 | Hughes et al. | |
| 5,900,005 A | 5/1999 | Saito | |
| 5,913,214 A | 6/1999 | Madnick et al. | |
| 5,933,811 A | 8/1999 | Angles et al. | |
| 5,948,061 A | 9/1999 | Merriman et al. | |
| 5,959,621 A | 9/1999 | Nawaz et al. | |
| 5,963,965 A | 10/1999 | Vogel | |
| 5,974,409 A | 10/1999 | Sanu et al. | |
| 5,974,455 A | 10/1999 | Monier | |
| 6,003,046 A | 12/1999 | Nielsen | |
| 6,012,053 A | 1/2000 | Pant et al. | |
| 6,067,541 A | 5/2000 | Raju et al. | |
| 6,067,552 A | 5/2000 | Yu | |
| 6,070,159 A | 5/2000 | Wilson et al. | |
| 6,073,135 A | 6/2000 | Broder et al. | |
| 6,100,890 A | 8/2000 | Bates et al. | |
| 6,112,193 A * | 8/2000 | Dlugos et al. | ............ 705/408 |
| 6,119,133 A | 9/2000 | Nusbickel et al. | |
| 6,151,624 A | 11/2000 | Teare et al. | |
| 6,182,063 B1 | 1/2001 | Woods | |
| 6,209,036 B1 | 3/2001 | Aldred et al. | |
| 6,269,361 B1 | 7/2001 | Davis et al. | |
| 6,292,473 B1 | 9/2001 | Duske et al. | |

(Continued)

FOREIGN PATENT DOCUMENTS

EP    0 837 583 A2    4/1998

(Continued)

OTHER PUBLICATIONS

PC Magazine, Web Information Managers, Mar. 3, 2000, available at http://zdnet.com/products/stories/reviews/0,4161,2445667,00.html.

(Continued)

*Primary Examiner*—Greta Robinson
*Assistant Examiner*—Kuen S. Lu
(74) *Attorney, Agent, or Firm*—Morgan & Finnegan, LLP

(57) ABSTRACT

In an information processing apparatus, information is obtained from an internet and a template is selected from a plurality of templates in each of which at least one item is set to be extracted. Data corresponding to the item set in the selected template is extracted from the obtained information and is saved.

28 Claims, 41 Drawing Sheets

U.S. PATENT DOCUMENTS

| | | | |
|---|---|---|---|
| 6,304,872 B1 | 10/2001 | Chao | |
| 6,345,289 B1 | 2/2002 | Lotspiech et al. | |
| 6,351,745 B1 | 2/2002 | Itakura et al. | |
| 6,366,956 B1 | 4/2002 | Krishnan | |
| 6,370,527 B1 | 4/2002 | Singhal | |
| 6,415,319 B1 | 7/2002 | Ambroziak | |
| 6,470,381 B1* | 10/2002 | De Boor et al. | 709/217 |
| 6,484,149 B1* | 11/2002 | Jammes et al. | 705/26 |
| 6,490,370 B1* | 12/2002 | Krasinski et al. | 382/195 |
| 6,493,758 B1 | 12/2002 | McLain | |
| 6,505,196 B1 | 1/2003 | Drucker et al. | |
| 6,507,855 B1* | 1/2003 | Stern | 715/513 |
| 6,516,312 B1 | 2/2003 | Kraft et al. | |
| 6,571,295 B1 | 5/2003 | Sidana | |
| 6,578,078 B1 | 6/2003 | Smith et al. | |
| 6,594,682 B1 | 7/2003 | Peterson et al. | |
| 6,651,090 B1* | 11/2003 | Itabashi et al. | 709/217 |
| 6,654,749 B1 | 11/2003 | Nashed | |
| 6,697,838 B1 | 2/2004 | Jakobson | |
| 6,704,741 B1* | 3/2004 | Lively et al. | 707/102 |
| 6,718,365 B1 | 4/2004 | Dutta | |
| 6,721,736 B1 | 4/2004 | Krug et al. | |
| 6,732,142 B1 | 5/2004 | Bates et al. | |
| 6,744,447 B1 | 6/2004 | Estrada et al. | |
| 6,778,194 B1 | 8/2004 | Jones | |
| 6,816,880 B1 | 11/2004 | Strandberg et al. | |
| 6,928,615 B1 | 8/2005 | Haitsuka et al. | |
| 2001/0007097 A1 | 7/2001 | Kim | |
| 2001/0020242 A1 | 9/2001 | Gupta et al. | |
| 2001/0032122 A1 | 10/2001 | Hankla | |
| 2001/0037377 A1 | 11/2001 | Nakano et al. | |
| 2001/0051927 A1 | 12/2001 | London et al. | |
| 2002/0002552 A1 | 1/2002 | Schultz et al. | |
| 2002/0013725 A1 | 1/2002 | Takakura et al. | |
| 2002/0023002 A1 | 2/2002 | Staehelin | |
| 2002/0035563 A1 | 3/2002 | Suda et al. | |
| 2002/0059398 A1 | 5/2002 | Shimabukuro | |
| 2002/0065800 A1 | 5/2002 | Morlitz | |
| 2002/0065857 A1 | 5/2002 | Michaelwicz et al. | |
| 2002/0069105 A1 | 6/2002 | Botelho et al. | |
| 2002/0075321 A1 | 6/2002 | Sakatani | |
| 2002/0077899 A1 | 6/2002 | Kaneko et al. | |
| 2002/0078197 A1 | 6/2002 | Suda et al. | |
| 2002/0147775 A1 | 10/2002 | Suda et al. | |
| 2003/0084096 A1 | 5/2003 | Starbuck et al. | |
| 2003/0131106 A1 | 7/2003 | Kasriel | |
| 2003/0132958 A1 | 7/2003 | Himmel et al. | |
| 2003/0160994 A1 | 8/2003 | Bates et al. | |
| 2003/0177202 A1 | 9/2003 | Suda et al. | |
| 2003/0195896 A1 | 10/2003 | Suda et al. | |

FOREIGN PATENT DOCUMENTS

| | | |
|---|---|---|
| EP | 0 843 269 A2 | 5/1998 |
| EP | 0 848 337 A1 | 6/1998 |
| EP | 0981097 | 8/1998 |
| EP | 1 067 470 A2 | 1/2001 |
| EP | 1 158 423 A2 | 11/2001 |
| EP | 0 843 269 B1 | 7/2004 |
| GB | 2324896 | 11/1998 |
| JP | 2001134646 A | 5/2001 |
| WO | WO 99 12108 | 3/1999 |
| WO | WO 99/12108 | 3/1999 |
| WO | WO 02/42940 A1 | 5/2002 |

OTHER PUBLICATIONS

Edward Mendelson, Webforia Organizer & Reporter, Mar. 3, 2000, available at http://www.zdnet.com/products/stories/reviews/0,4161,2444585,00.html.

Nelson King, iHarvest One, Mar. 3, 2000, available at http://www.zdnet.com/products/stories/reviews/0,4161,2444582,00.html.

Nelson King, Netonizer 1.1, Mar. 3, 2000, available at http://www.zdnet.com/products/stories/reviews/0,4161,2444583,00.html.

Nelson King, WebSpace 1.1a, Mar. 3, 2000, available at http://www.zdnet.com/products/stories/reviews/0,4161,2444586,00.html.

Nelson King, WebWhacker 2000, Mar. 3, 2000, available at http://www.zdnet.com/products/stories/reviews/0,4161,2444587,00.html.

Preston Gralla, Organize Your Net Research—For Free, Mar. 13, 2000, available at http://www.zdnet.com/anchordesk/story/story_4513.html.

Edward Mendelson, 30 Ways to Browse Better, Oct. 17, 2000, available at http://www.pcmag.com/article/0,2997,s%3D1590%26a%3D5921,00.asp.

GERASoft PageSaver, available at http://www.gerasoft.com/psmain.html, downloaded on Apr. 2, 2002.

SpotOn Professional—Product Features List, available at http://www.spoton.com/solutions/features.html, downloaded on Apr. 2, 2002.

SurfSaver Software—Download it today!—It's Free, available at http://www.surfsaver.com, downloaded on Apr. 2, 2002.

Anonymous, "Java Applet Language Translator" IBM Technical Disclosure Bulletin, IBM Corp. New York, US, vol. 42, No. 420, Apr. 1, 1999, whole document.

"IE5 Web Accessories" Internet, Online! Apr. 25, 2000 Retrieved from the Internet: URL: http://www.netmag.co.uk/ie5/access.htm (retrieved May 27, 2003) whole document.

Katz, B et al. "Integrating Web Resources and Lexicons into a Natural Language Query System" IEEE International Conference on Multimedia Computing and Systems, 1999, Florence, Italy, Jun. 7, 1999.

Cockburn, A et al. "Issues of Page Representation and Organization in Web Browser's Revisitation Tools" Proceedings of the OZCHI, Australian Conference on Human Computer Interaction, Nov. 28, 1999.

Athman B et al., World wide database integrating the web, CORBA and Databases, 3 pages.

Chen et al., "WebCiao: A website Visualization and Tracking System", Proceedings of WebNet97, 1997.

"Make Web pages Available for Offline Viewing", http://www.microsoft.com/windowsxp/using/mobility/learnmore/offlineviewing.mspx, Accessed: Aug. 25, 2005, Published: Aug. 24, 2001.

"Leech", Dec. 6, 2001 Archive Page from Archive.com of http://www.aeria.com/products/leech Accessed: Aug. 25, 2005.

"Offline Navigator 1.01", http://www.afreego.com/Categories/Web_Tools/Offline_Web_Readers/006390.php Accessed: Aug. 25, 2005.

http://www.uspto.gov Accessed: Aug. 25, 2005.

http://www.whitehouse.gov/government/cabinet.html Accessed: Aug. 25, 2005.

Katz B. et al. "Integrating Web Resources and Lexicons into a Natural Language Query System" IEEE International Conference on Multimedia Computing and Systems, Florence Italy, Jun. 7-11, 1999.

Cockburn A. et al. "Issues of Page Representation and Organisation in Web Browser's Revisitation Tools" Australian Conference on Human Computer Interaction, Proceedings of the Ozchi, Nov. 28, 1999.

Non-Final Office Action of Application No. 10/116,932, dated May 3, 2006.

Final Office Action of Application No. 09/865773, dated Jul. 17, 2006.

Seung-Jin Lim et al. "extracting structures of HTML doccuments", twelth international conference on information networking, 1998, pp. 420-426.

* cited by examiner (a)
KPTConcept

KPTConcept
{
  ObjectID            KPTObjID
  ModifyStatus      KPTStatus
  ...
}

(b)
KPTPerson

KPTPerson : KPTConcept
{
  RememberAs      String
  Name              String
  Phone            String
  Email             String
  Fax               String
  URL              String
  ...
}

(c)
KPTDocument

KPTDocument : KPTConcept
{
  RememberAs      String
  Name              String
  PhysicalURL       String
  LogicalURL        String
  Orgn              String
  Domain           String
  Keywords         String
  Title              String
  FolderName       String
  LinkType         KPTLinkType
  RetrievedDoc      bool
  ...
}

FIG. 21

(a)
KPTAction

KPTAction : KPTConcept
    {
      Type                      KPTActionType
      Actor                     KPTPerson
      Object                  KPTConcept   //Document or Action
      From                    KPTConcept
      To                        KPTConcept
      How                     KPTInstrumentType
      WhenToDo          KPTTime
      WhenDone          KPTTime
      ConnectedTo       KPTConnenctionList
      SessionID          KPTObjID
      ActionStatus       KPTActSysStatus
      UserStatus         KPTUsrStatus
      ActImportance      KPTImportance
      ...
    }

(b)
KPTContent

KPTContent : KPTConcept
    {
      URL                     String
      FileName            String
      KPTDocID            KPTObjID
      ContentType       KPTMimeType
      ContentLength     long
      ...
    }

FIG. 22

(a)
KPTTemplate

KPTemplate : KPTConcept
   {
     Type                   KPTTemplateType
     KPTFieldList        KPTData    //List of Fields
     ...
   }

(b)
KPTData

KPTContent : KPTConcept
   {
     FieldName          String
     FieldType           KPTFieldType
     FieldDefaultValue    KPTConcept
     FieldXPosition       Number
     FieldYPosition       Number
     FieldXSize           Number
     FieldYSize           Number
     AutoDetect           KPTConcept Value                KPTConcept

KPTDoc Knowledge Base

| ObjectID | KeepAs | LogicalURL | Orgn | Domain | Keywords | Folder | ... |
|---|---|---|---|---|---|---|---|
| D630a816 | Saora | saora.co.jp | saora | JP.CO | KPT, Yoko. | D630a816 | ... |
| D630a932 | KPT | kpt.com | kpt | COM | KPT | D630a932 | ... |
| D630b232 |  | kpt.com/faq | kpt | COM |  |  | ... |
| D233x123 | Saora | saora.com | saora | COM |  | D233x123 | ... |
| D133f822 |  | sales.paltek.com | paltek,sales | COM | ALTERA, . | D133f822 | ... |
| D2340x13 | HNS | sales.hns.ne.jp | hns, sales | JP.NE | Kiosk, India | D2340x13 | ... |
| ... | ... | ... | ... | ... | ... | ... |  |

(b)

KPTAction Knowledge Base

| ObjectID | Type | KPTDocID | Done Time | SessionID | ValidTime | ... |
|---|---|---|---|---|---|---|
| A238x231 | StartSE |  | 00/03/10 13:38:02 |  |  | ... |
| A238x123 | Save | D630a816 | 00/03/10 13:38:22 | A238x231 | 00/03/10~01/03/10 | ... |
| A238x232 | Save | D630a932 | 00/03/10 14:18:42 | A238x231 | 00/03/10~ | ... |
| A980o232 | EndSE |  | 00/03/10 14:20:15 |  |  | ... |
| A909u898 | StartSE |  | 00/04/19 12:12:00 |  |  | ... |
| A323f229 | Save | D630b232 | 00/04/19 12:22:13 | A909u898 | 00/04/25~00/04/30 | ... |
| A902o230 | EndSE |  | 00/04/19 14:12:23 |  |  | ... |
| A721n292 | StartSE |  | 00/04/19 12:12:00 |  |  | ... |
| A723b232 | Save | D630a816 | 00/04/19 12:12:23 | A721n292 |  |  |
| ... | ... | ... | ... | ... | ... |  |

KPTPerson Knowledge Base

| ObjectID | KeepAs | Name | Email | Phone | Extracted | ... |
|---|---|---|---|---|---|---|
| P324o902 | Saora | Saora Inc. | support@saora.co.. | 04591398 | saora.co... | ... |
| P421y232 | Kato | Nihon Kato | kato@saora.com | | | ... |
| P234x234 | | HNS Inc. | siva@hns.com | | hnsonie.com | ... |
| ... | ... | ... | ... | ... | ... | ... |

(b)

KPTContent Knowledge Base

| ObjectID | URL | Filename | KPTDocID | Content Type | ContLen | ... |
|---|---|---|---|---|---|---|
| F232j233 | saora.co.jp/logo.gif | logo.gif | D630a816 | IMAGE/GIF | 212 | ... |
| F802u233 | saora.co.jp/jap.gif | jap.gif | D630a816 | IMAGE/GIF | 128 | ... |
| F232q897 | kpt.com/img/logo.gif | logo1.gif | D630a932 | IMAGE/GIF | 232 | ... |
| F329x800 | kpt.com/music/a.mid | a.mid | D630a932 | MIME/MIDI | 987 | ... |
| ... | ... | ... | ... | ... | ... | ... |

KPTPTemplate Knowledge Base

| ObjectID | Template | Type | Fields | FieldType | Position | ... |
|---|---|---|---|---|---|---|
| T232j233 | Contact Information | SYSTEM | KeepAs, Name... | String, String | (0,0,10,10)..., | ... |
| T802u233 | Company Information | SYSTEM | Name, No,,... | String,Num.. | (10,10,10,10)..., | ... |
| T232q897 | Link Information | SYSTEM | URL,Date,... | String, Date,. | (0,0,10,10)..., | ... |
| T329x800 | History Project | USER | Name, DOB,... | String, Date | (0,0,5,5)..., | ... |
| ... | ... | ... | ... | ... | ... | ... |

(b)

KPTData Knowledge Base

| ObjectID | Template | Value | ... |
|---|---|---|---|
| X232j233 | History Project | Abraham Lincoln, Jan 27, 1809, USA, ..., ..., http://youfind.com,indefinite | ... |
| X802u233 | History Project | M.K. Gandhi, Oct 2, 1869, India,,..., ..., http.//youkeep.com, indefinite | ... |
| X232q897 | Contact Info | Saora, Saora Inc., 045-913-9820, ..., ..., ... | ... |
| X329x800 | ... | ... | ... |
| ... | | | ... |

| kee<p>oint Extract  X | ⇦ Back  ⇨ Forward  ⊗ Stop  Refresh |
|---|---|
| Air Ticket ▼  Create | URL: http://youfly.com |
| AutoExtract | Tokyo, Japan(NRT) to Dallas, TX(DFW) |
| From  Narita | |
| To  Dallas Fortworth | USD 530.00 (plus Tax) |
| Cost  $530.00 | Round-Trip |
| Airlines  ⟵ | AIR1  Airways1 |
| Memo  Advance Purchase: 28 days  Latest Travel: 30Sep00  Earliest Return: 3 | Advance Purchase: 28 days  Latest Travel: 30Sep00  Earliest Return: 03 days  Latest Return: 3 months |
| URL:  youfly.com | USD 639.00 (plus Tax)  Round-Trip  AIR2  Airways2 |
|  | Advance Purchase: 10 days  Latest Travel: 13Sep00  Earliest Return: 07 days  Latest Return: 3 months |
| Save  New | USD 640.00 (plus Tax)  Round-Trip  AIR3  Airways3 |

FIG. 38

| kee<p>oint Show All Links    X | |
|---|---|
| Air Ticket ▼   Create | Prev   Next |
| + New Delhi<br>+ Paris<br>+ Sydney<br>+ Dallas FortWorth<br>    + AIR1(530.00)<br>       - http://youfly.com<br>       - http://tkt.com<br>       - ...<br>    + AIR2(639.00)<br>       - http://youfly.com<br>    + AIR3(640.00)<br>+ ... | From   Narita<br>To   Dallas Fortworth<br>Cost   $530.00<br>Airlines   Airways 1<br>Memo   Advance Purchase: 28 days<br>Latest Travel: 30Sep00<br>Earliest Return: 3<br>URL:   youfly.com<br><br>List   Save |

FIG. 39

| | kee<p>oint Show All Links    X | | | | |
|---|---|---|---|---|---|
| | Air Ticket ▼  Create | | Prev   Next | | |
| | + New Delhi | From | To | Cost | Airlines |
| | + Paris | | | | |
| | +̶ S̶y̶d̶n̶e̶y̶ | Narita | DFW | 530.00 | AIR1 … |
| | +̶ D̶a̶l̶l̶a̶s̶ ̶F̶o̶r̶t̶W̶o̶r̶t̶h̶ | | | 639.00 | AIR2 |
| |    + AIR1(530.00) | | | 640.00 | AIR3 |
| |       - http://youfly.com | Narita | DFW | 1020.00 | AIR4 .. |
| |       - http://tkt.com | Narita | DFW | 910.00 | AIR6 .. |
| |       - … | | | | |
| |    + AIR2(639.00) | | | | |
| |       - http://youfly.com | | | | |
| |    + AIR3(640.00) | | | | |
| | + … | | | | |
| | | Save    New | | | |
| | | View    Delete | | | |

FIG. 40

| kee<p>oint Template X | Create/Modify Template |

Shopping ▼

Name: [          ]

Cost: [   $0.00  ]

Photo: [          ]

Template Name: Shopping

[ Add ] [ Remove ]

FieldName: [ Photo ]
Type: [ Image ▼ ]
Value: [          ]
AutoDetect: [ Image, Photo, Pict ]

Position: *(please position the object in the left view)*

| Field | Type | Auto | Position ... |
|---|---|---|---|
| Name | STRING | Name | 5,20,200,10 |
| Price | AMOUNT | OurPrice,. | 5,30,200,10 |
| ... | | | |

[ Save ] [ Delete ]

FIG. 41

APPARATUS AND METHOD FOR EXTRACTING DATA

SUMMARY

According to one embodiment, the present invention relates to an apparatus comprising information obtaining means for obtaining information, template selection means for selecting a template from a plurality of templates in each of which at least one item is set to be extracted, extraction means for extracting data corresponding to the item set in the template selected by said template selection means, from the obtained information and saving means for saving data extracted by said extraction means.

According to another embodiment, the present invention relates to a method that comprises the steps of obtaining information, selecting a template from a plurality of templates in each of which at least one item is set to be extracted, extracting data corresponding to the item set in the selected template and saving the extracted data.

According to yet another aspect, the present invention relates to an information processing program for controlling a computer to perform the steps of obtaining information, selecting a template from a plurality of templates in each of which at least one item is set to be extracted, extracting data corresponding to the item set in the selected template and saving the extracted data.

Other features and advantages of the present invention will be apparent from the following description taken in conjunction with the accompanying drawings, in which like reference characters designate the same or similar parts throughout the figures thereof.

BRIEF DESCRIPTION OF THE FIGURES

The accompanying drawings, which are incorporated in and constitute a part of the specification, illustrate embodiments of the invention and, together with the description, serve to explain the principles of the invention.

FIG. 21 shows an example of the knowledge structures in the knowledge base.

FIG. 22 shows an example of the knowledge structures in the knowledge base.

FIG. 23 shows an example of the knowledge structures in the knowledge base.

FIG. 24 shows an example content of the knowledge base.

FIG. 25 shows an example content of the knowledge base.

FIG. 26 shows an example content of the knowledge base.

FIG. 37 shows another example User Interface of Data Extraction.

FIG. 38 shows another example User Interface of Data Extraction.

FIG. 39 shows another example User Interface of Retrieval by Show all Links.

FIG. 40 shows an example User Interface of extracted data displayed in tabular form.

FIG. 41 shows an example User Interface for Template Creation and Template Editing.

DETAILED DESCRIPTION

The present invention is a method, system and apparatus for extracting data from another location and saving it in a local environment. According to one embodiment, the other location may be remote and accessible using the Internet.

A preferred embodiment of the present invention will now be described in detail with reference to the accompanying drawings.

Figure 1:
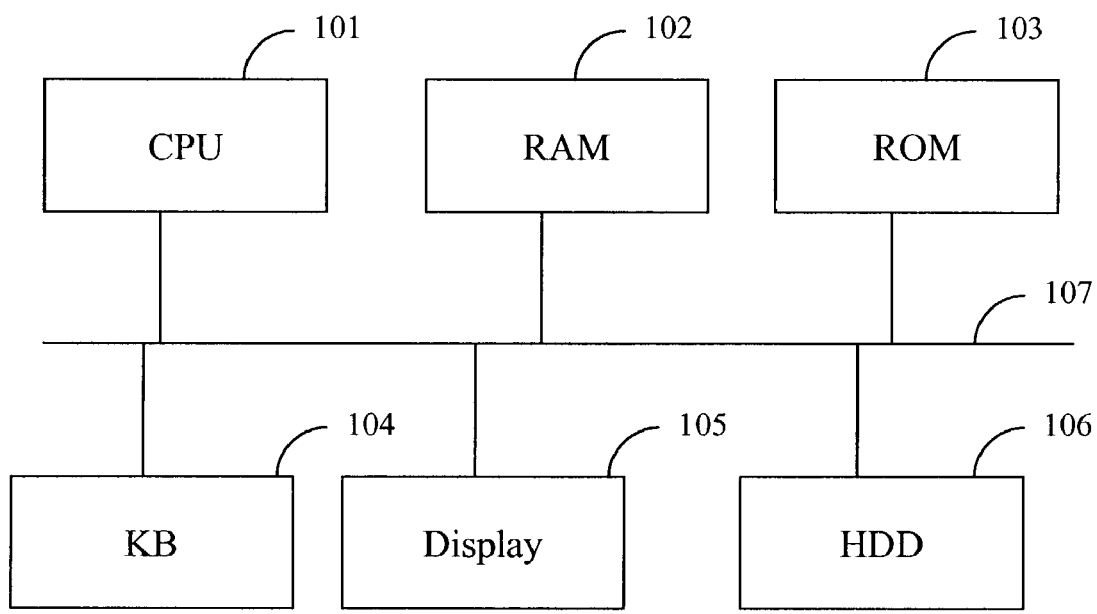
FIG. 1 is a block diagram illustrating the hardware configuration according to an embodiment of the present invention.

FIG. 1 is a block diagram illustrating the hardware configuration according to an embodiment of the present invention. In this figure, a central processing unit (CPU) 101 is operative to perform operations for various processing and make a logical decision or the like and further controls each composing element connected to a bus 107.

A RAM 102 temporarily stores variables and intermediate data generated during the processing. A program from an external source may be loaded into the RAM 102. A ROM 103 is used to store programs, which correspond to individual flowcharts that will be described later and which are to be executed by the CPU 101, and fixed data.

A keyboard (KB) 104 is used for inputting data and an instruction by a user. A mouse or other input devices may be used with the keyboard 104. Display 105 displays data and a hard disk drive (HDD) stores data of a database, a program, and the like.

The bus 107 is used to transfer an address signal indicating a composing element to be controlled by the CPU 101, a control signal used for controlling each composing element and data to be exchanged between the composing equipments.

Figure 2:
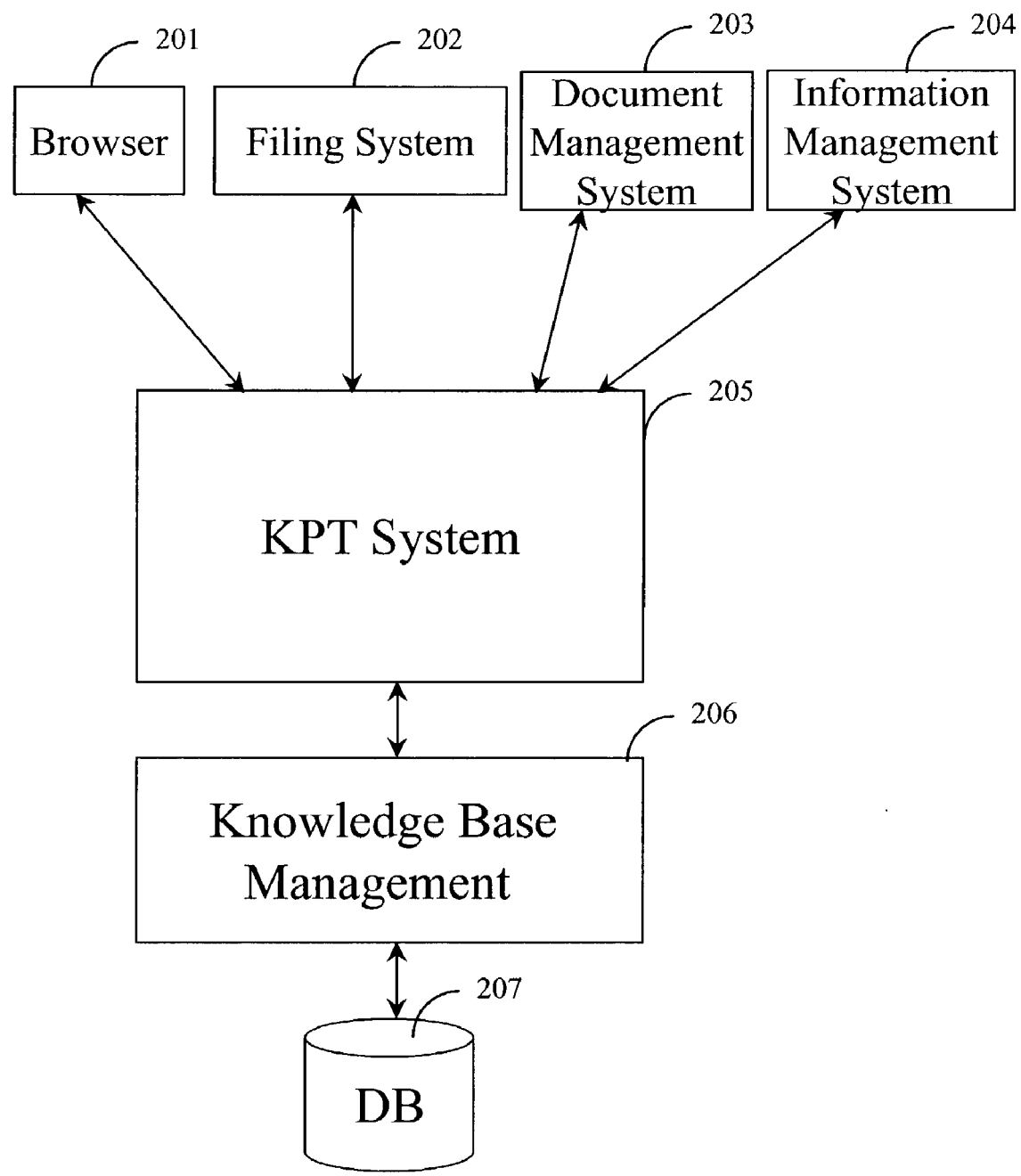
FIG. 2 shows the functional block diagram of information processing system embodying the present invention.

FIG. 2 shows the functional block diagram of information processing system embodying the present invention. Browser 201 is used for information browsing of the Web. Filing system 202 is for filing and managing files. Document Management System 203 is for managing documents. Information Management System 204 is for managing information other than documents. KPT System interacts and acts as a controlling system as explained in detail in this embodiment to Browser 201, Filing System 202, Document Management System 203 and Information Management System 204. Knowledge Base Management 206, is the management of knowledge accessed/stored from/to the Database 206.

Figure 3:
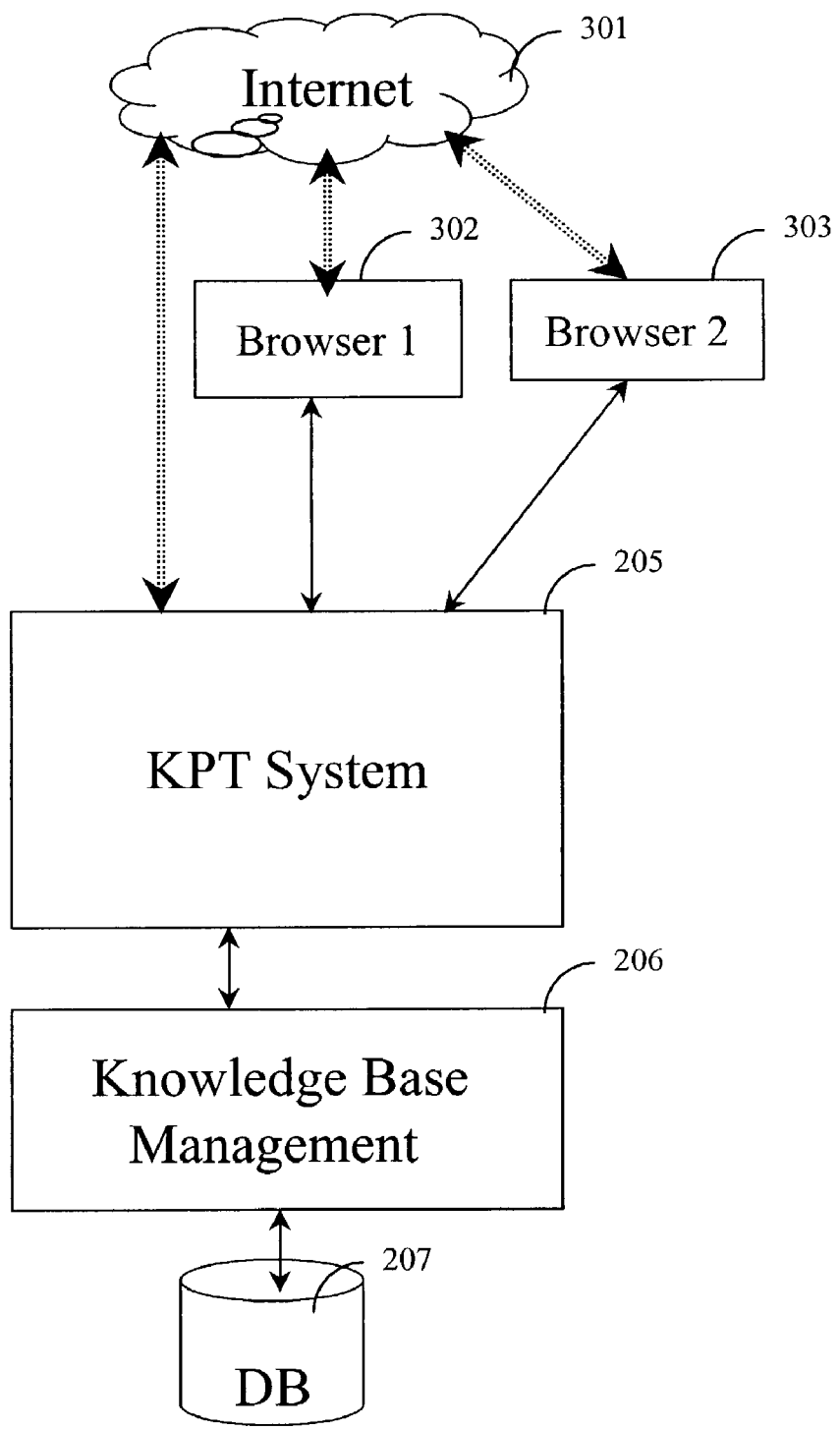
FIG. 3 shows the functional block diagram of information browsing system embodying the present invention.

FIG. 3 shows the functional block diagram of information browsing system embodying the present invention. The information on the Internet 301 is browsed using multiple browsers 302, 303 simultaneously and as explained in this embodiment, KPT System 205 handles and processes them separately.

Figure 4:
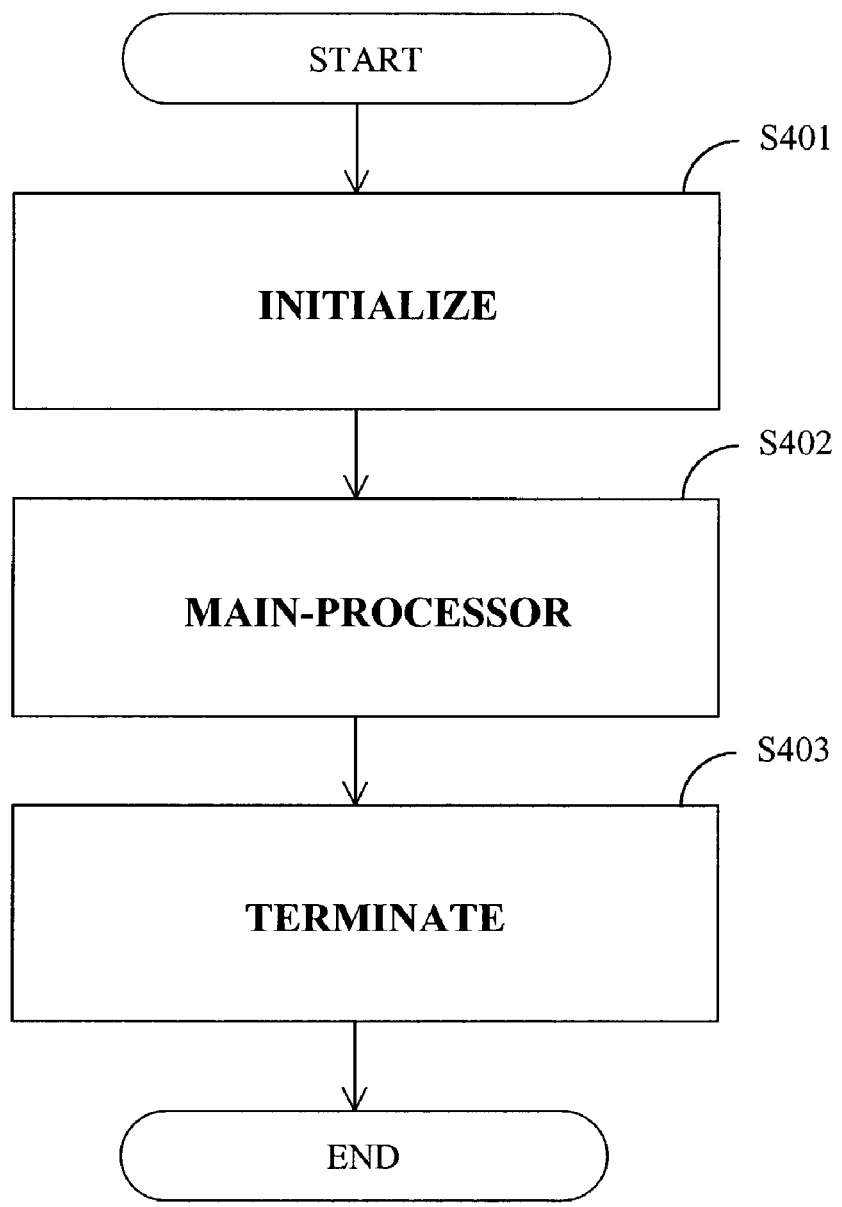
FIG. 4 is a flowchart of the main procedural steps of this embodiment.

FIG. 4 is a flowchart of the main procedural steps of this embodiment. The following description is for an example system, which connects to the Internet and allows browsing, extracting and saving of the information. In step S401, initialization processes to connect to the Internet are executed. In step S402, main function processing browsing, extracting, saving, managing stored information etc. of this embodiment is performed. In step S403, terminate or cleanup processing is executed.

Figure 5:
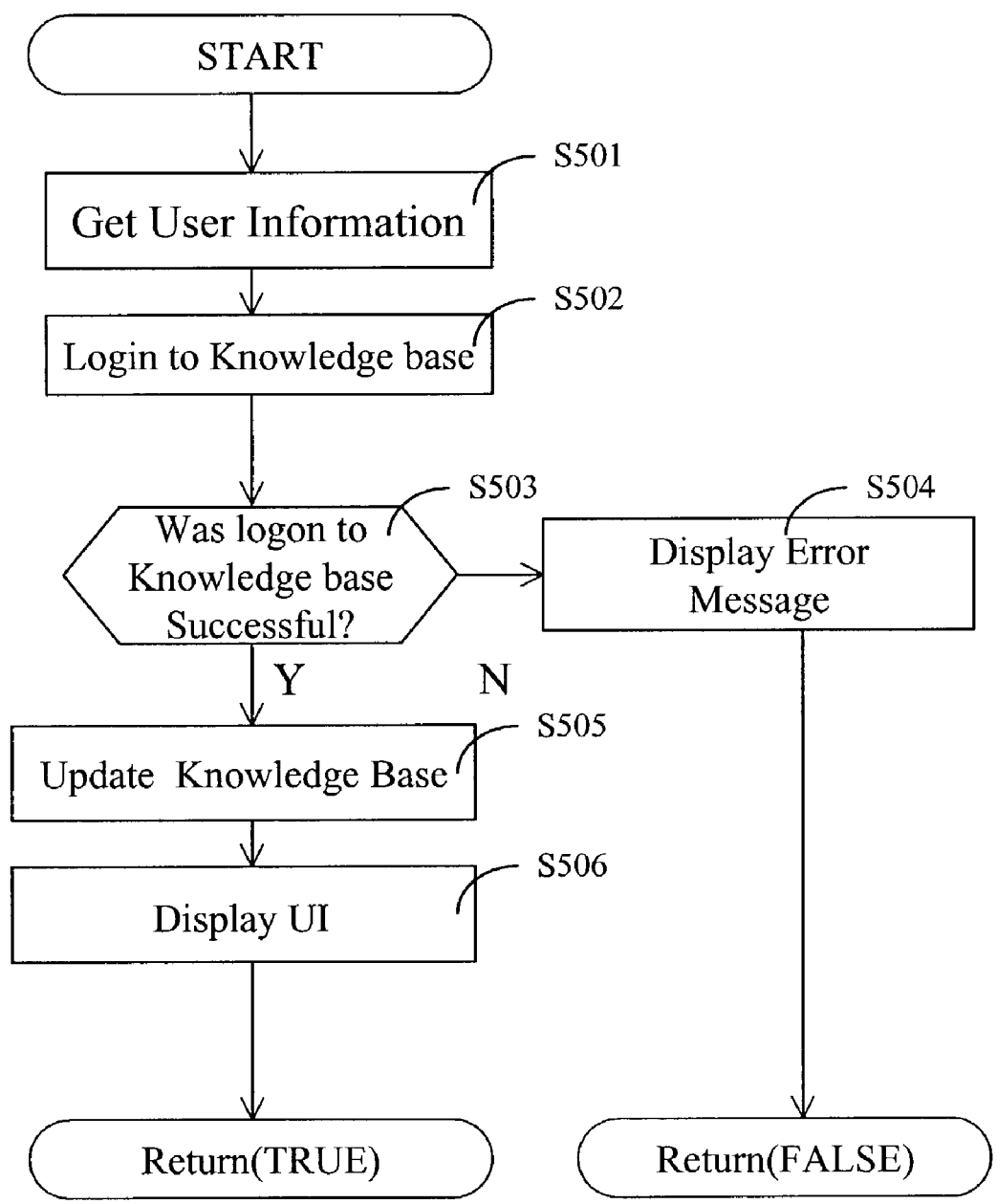
FIG. 5 is a flowchart of INITIALIZE procedure.

FIG. 5 is a flowchart of INITIALIZE procedure of step S401. In step S501, the user's information is obtained either from conventional methods, for example, a predefined place or based on user input or operating system login user information and the like. In step S502, based on the obtained user information, the embodiment logs into the Knowledge base 206. A check is made to determine if the logon was successful or not in step S503 and if not, an error message is displayed in the step S503 and the process returns false. Otherwise, in step S505, the knowledge base is updated. The main UI of this embodiment is displayed in step S506 and the process return true.

Figure 6:
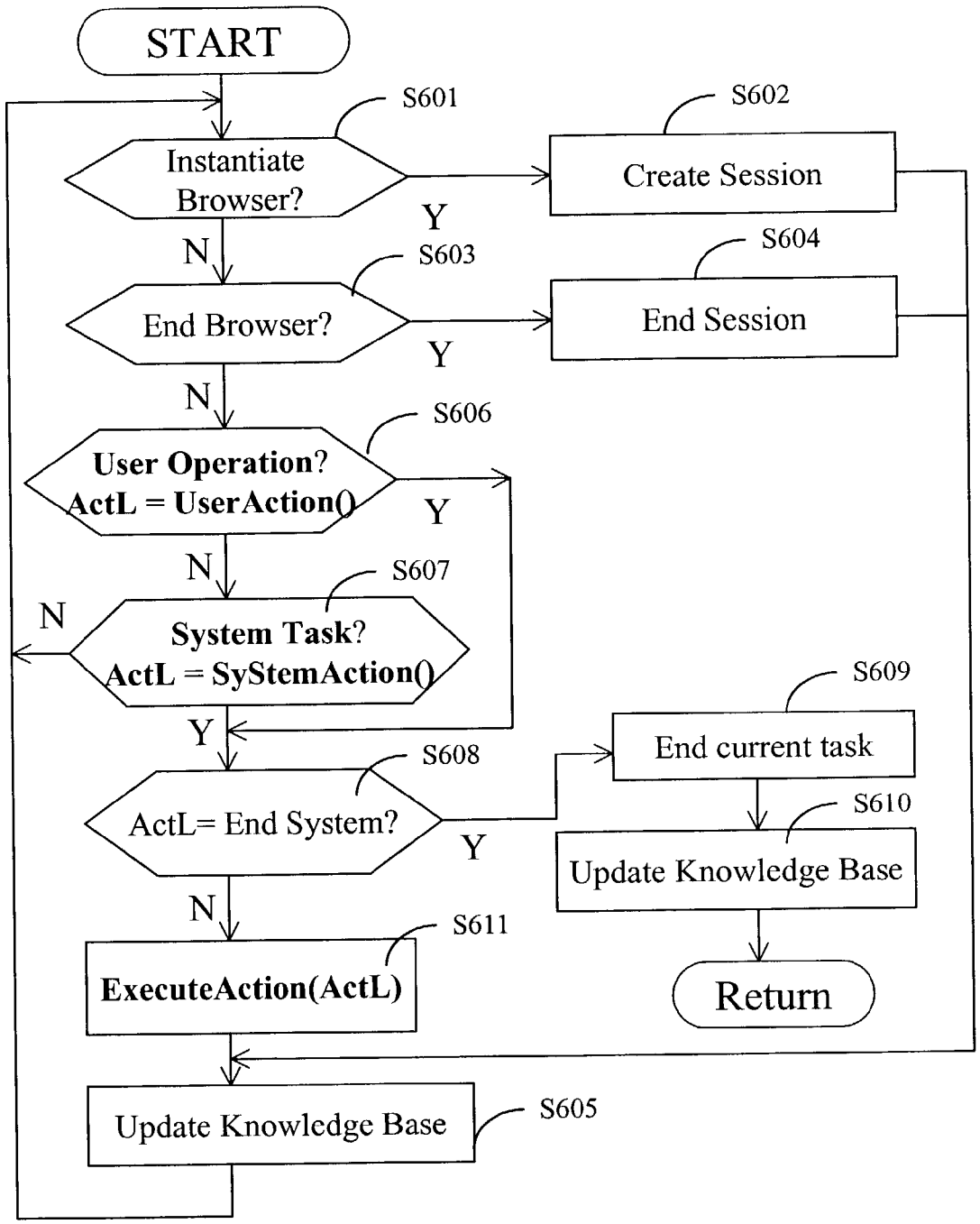
FIG. 6 is a flowchart of MAIN-PROCESSOR.

FIG. 6 is a flowchart of MAIN-PROCESSOR of step S402. In step S601, a check is made to determine if the browser needs to be instantiated or not. If so, a new session is created in step S602 and the process proceeds to step S605, wherein the knowledge base is updated. If not, a check is made in step S603 to determine if the browser was terminated or ended. If so, the session associated with the browser is ended in step S604 and proceeds to step S605. If not, in step S606, a check is made to determine, if the user performed any action, details of which are explained in FIG. 7, in which the case ActL is set to the user action and process proceeds to step S608. Otherwise, a check is made in step S607, determine if any SystemTask ActL, details of which are explained in FIG. 14, needs to be executed. If not, the process returns to step S601, otherwise a check is made in step S608 to determine, the action performed either by the user or system, ActL is to end the system. If so, all the current tasks are terminated in step S609 and the knowledge base updated in step S610 and the process returns. If not, the process moves to step S611, wherein the action ActL, is executed by ExecuteAction, details of which are explained in FIG. 17.

Figure 7:
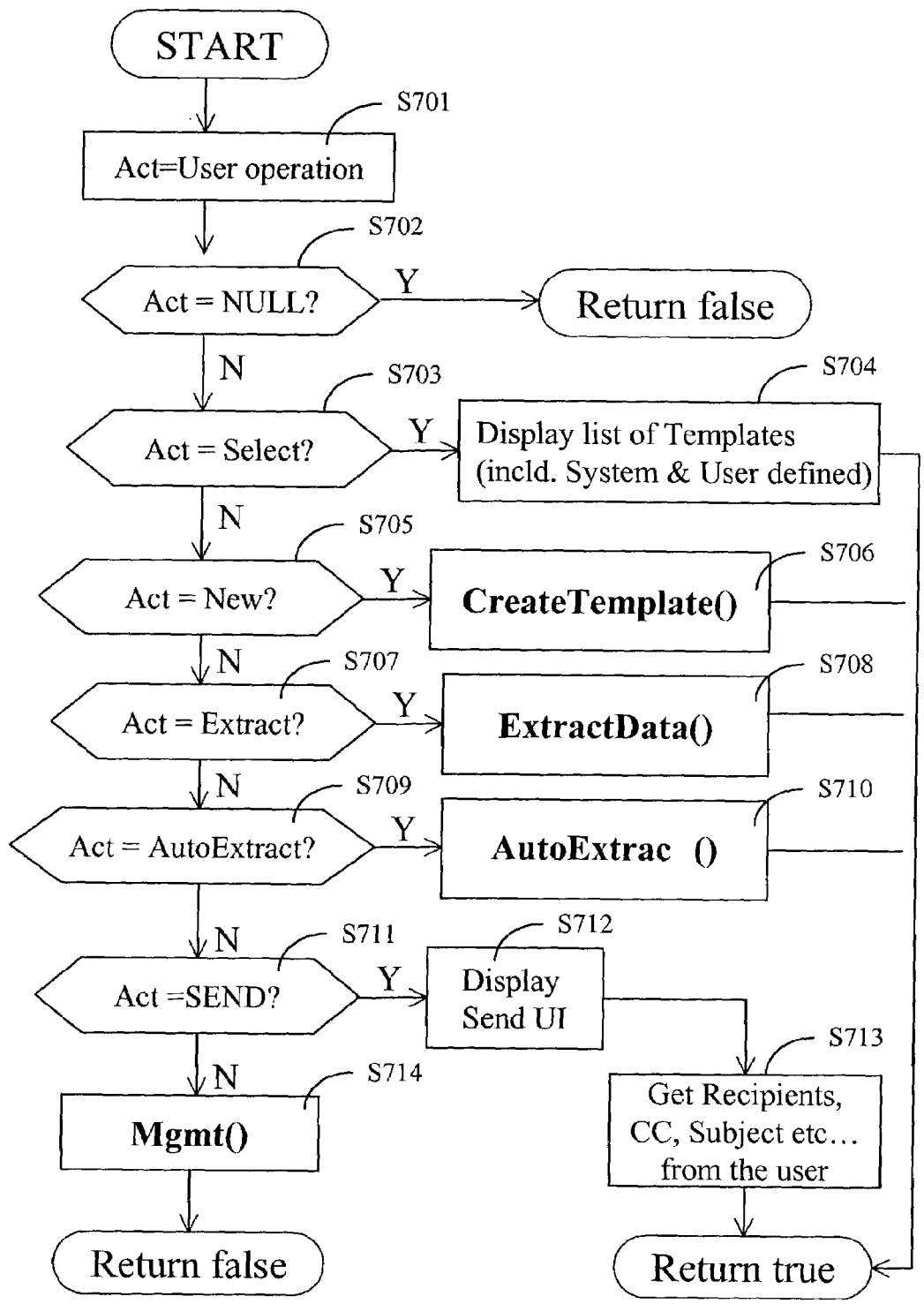
FIG. 7 is a flowchart of the procedural steps of UserAction.
Figure 31:
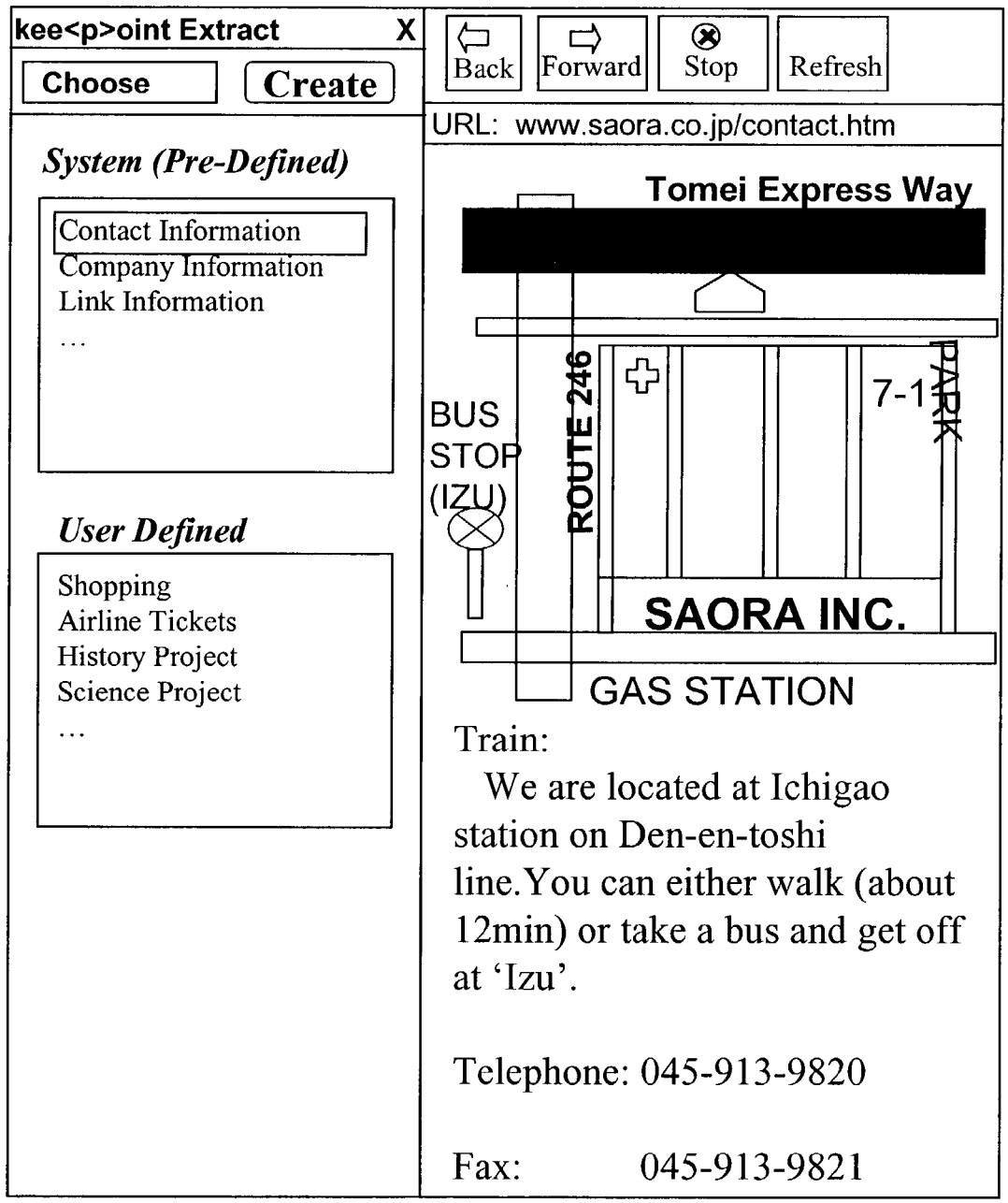
FIG. 31 shows an example User Interface of Data Extraction of this embodiment.

FIG. 7 is a flowchart of the procedural steps of S606, UserAction of this embodiment. First in step S701, the Act is set to the input user action. A check is made in step S702 to determine if Act is equal to NULL. If so, the process returns false. If it is not NULL, the process proceeds to step S703, wherein, a check is made to determine whether Act is Select, which is input for example, by clicking on the Choose button. If Act is Select, in step S704, the list of templates, including the system and the user defined are displayed and process returns true. FIG. 31 shows an example User Interface of Data Extraction of this embodiment. As can be seen from the figure, for extracting the data from the right hand side of the screen, the template needs to be first selected On the left hand side of the screen, the list of templates, both the predefined or system defined are shown along with the user defined templates. A check is made in step S705, to determine if Act is New, which is input for example, by clicking on the CreateNew button. If so, the process proceeds to step S706, CreateTemplate, details of which are explained in FIG. 8, wherein a the user can create a new template and process returns true. If not, a check is made in step S707 to determine if the Act is Extract, in which case ExtractData, whose details are explained later in FIG. 9, wherein the user can extract the relevant data, is executed in step S708 and process returns. If not, a check is made in step S709 to determine if the Act is AutoExtract, in which case AutoExtract, whose details are explained later in FIG. 10, wherein the embodiment automatically extracts all the relevant data, is executed in step S710 and process returns. If not, a check is made in step S711 to determine if Act is Send, in which case the user interface for send is displayed in step S712 and the items required for constructing and sending a email message, like the mail recipients (To, CC, Bcc etc . . . ), Subject and contents are obtained from the user in step S713 and process returns. If not, Mgmt, details of which are explained in FIG. 11, is executed in step S714 and the process returns false.

Figure 8:
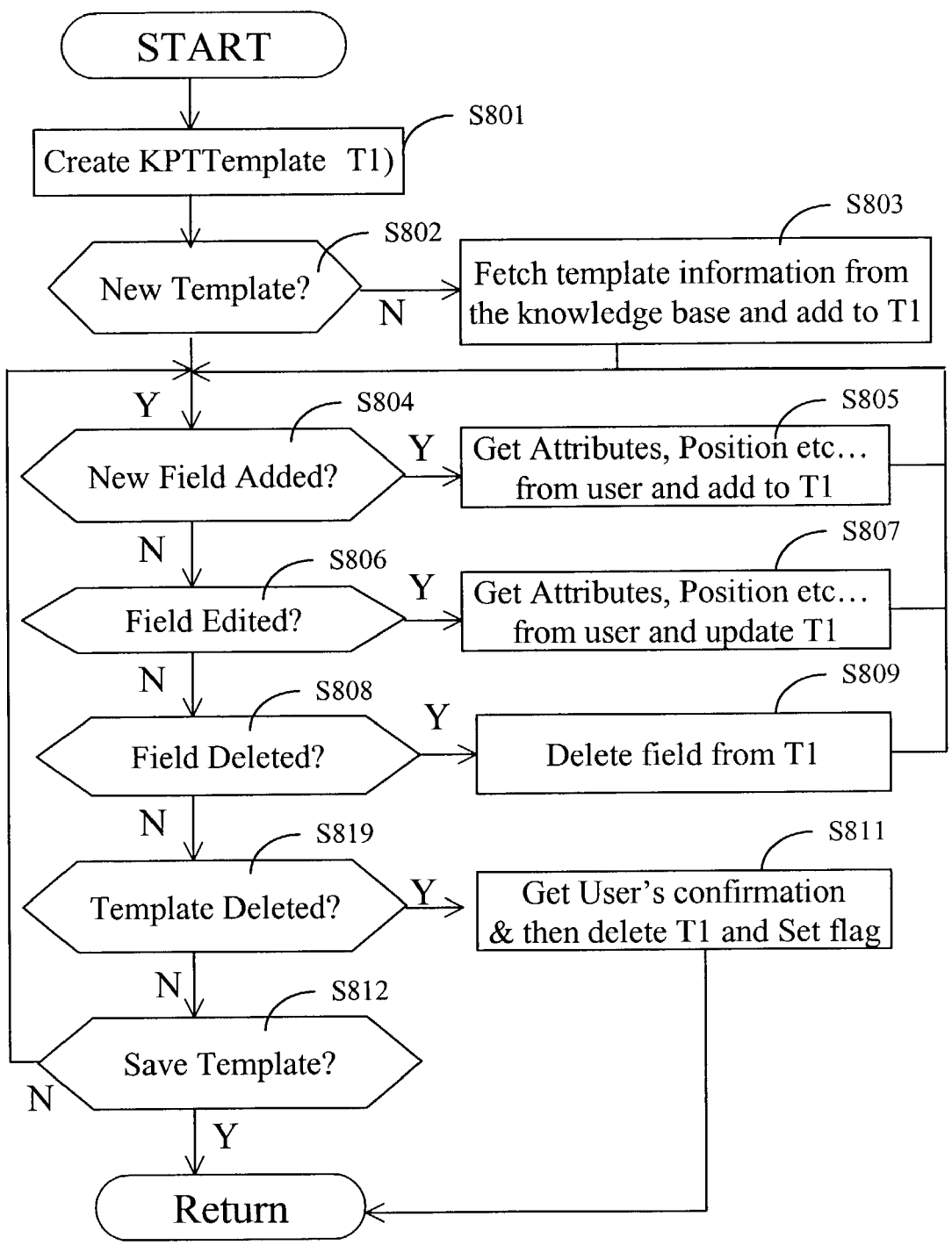
FIG. 8 is a flowchart of the procedural steps of CreateTemplate.

FIG. 8 is a flowchart of the procedural steps of S706, CreateTemplate of this embodiment. Knowledge structure KPTTemplate, T1 is created in step S801. A check is made in step S802 to determine, if it a new template is to be created. If not, the information associated to the template T1 is fetched from the knowledge base and the structure T1 is updated in step S803. In either case the process proceeds to step S804, wherein a check is made to determine if a new field has been added. If so, the attributes, position information and other required information about the field are obtained and the knowledge structure T1 is updated in step S805 and process returns to step S804. Otherwise, a check is made in step S806, to determine if the existing field has been edited, in which case, step S807 is executed, wherein the new information about the field are obtained and the knowledge structure T1 is updated in and process returns to step S804. Otherwise, a check is made in step S808, to determine if the field has been deleted, in which case, step S809 is executed, wherein the information associated to the deleted field is deleted from the knowledge structure T1 and process returns to step S804. Otherwise, a check is made in step S819, to determine if the template itself has been deleted, in which case, step S811 is executed, wherein the user's confirmation is obtained and the template T1 is marked to be deleted and the process returns. Otherwise, a check is made in step S812 to determine if the user requested for saving of the template, in which the case process returns, otherwise it loops back to step S804. FIG. 41 shows an example User Interface for Template Creation and Template Editing. As can be seen from the figure, fields can be added or removed using the 'Add' and 'Remove' respectively. The left hand side, displays all the fields in the current template. To add a new field, the necessary information is selected or input on the right hand side. For example, the field name, type of field—Text, Image etc . . . , default value, keywords for auto detect, position in the template—which is specified by positioning the field physically on the left hand side of the screen. The template thus created can be saved to the knowledge base using Save or deleted permanently from the knowledge base.

Figure 9:
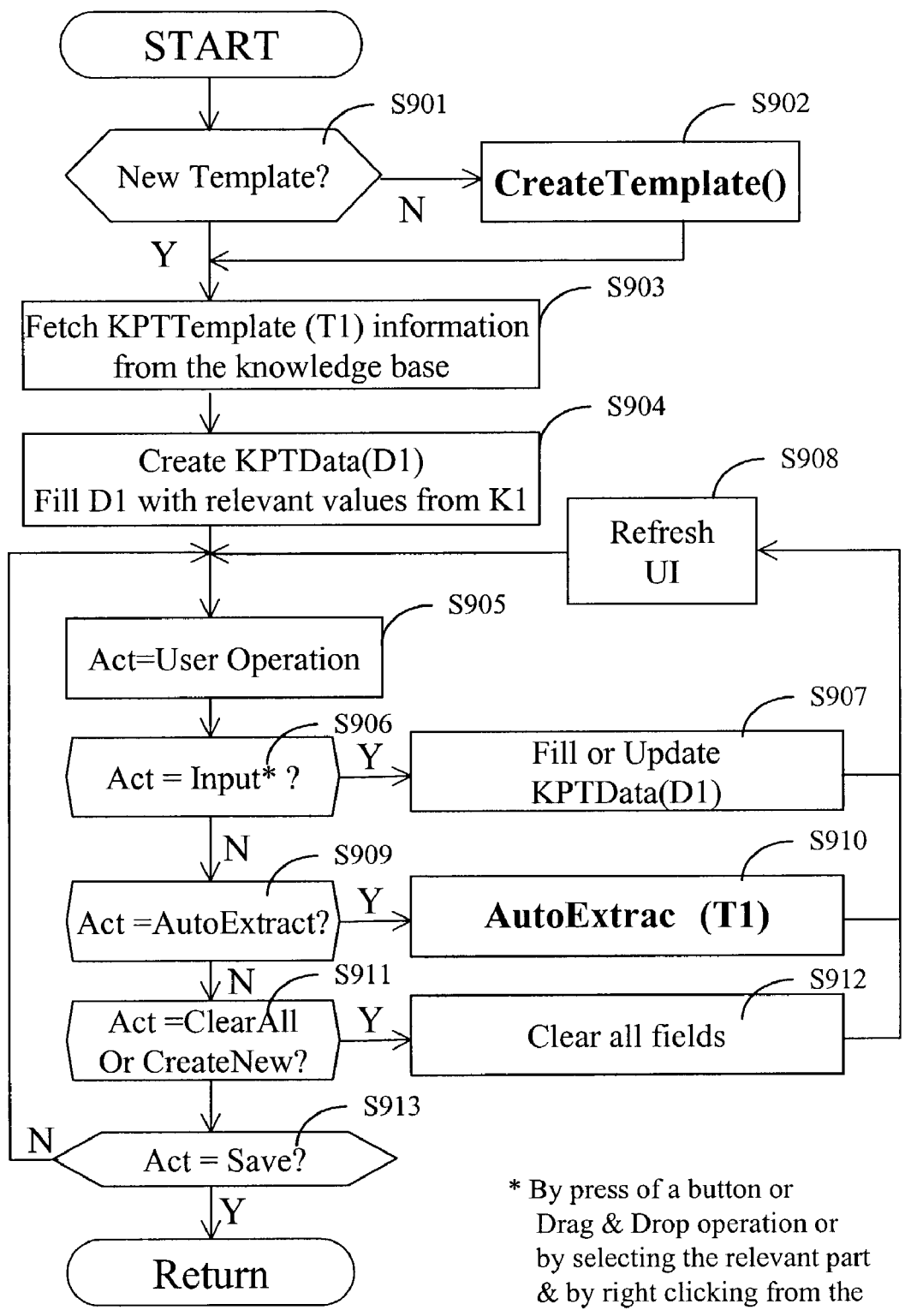
FIG. 9 is a flowchart of the procedural steps of ExtractData.
Figure 32:
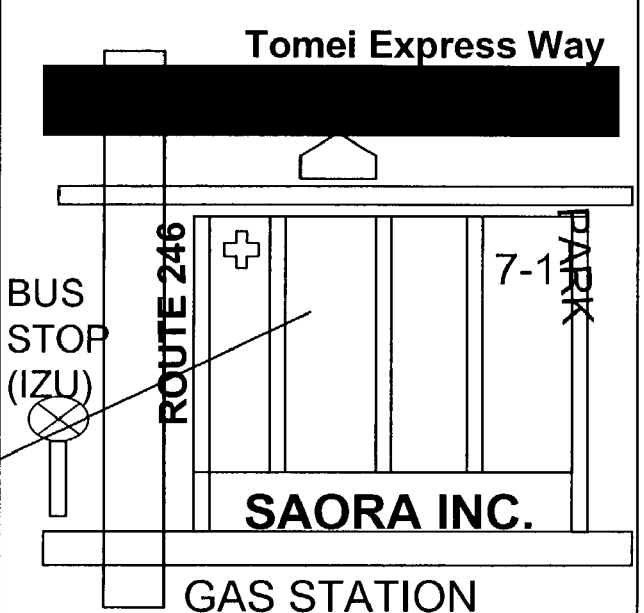
FIG. 32 shows another example User Interface of Data Extraction.

FIG. 9 is a flowchart of the procedural steps of S708 ExtractData. A check is first made in step S901 to determine, if a new template needs to be created, in which case, CreateTemplate S902, which is explained in detail earlier in FIG. 8 is executed. In either case, step S903 is executed, wherein the information associated to the template, knowledge sructure KPTTemplate T1 is fetched from the knowledge base. In step S904, the knowledge structure KPTData D1, is created and D1 is filled with relevant values from K1. In step S905, the action performed by the user is obtained in step S905. A check is made in step S906 for any user inputs. If so, step S907 is executed, wherein the knowledge structure KPTData D1 is updated and process moves to step S908, wherein the display is refreshed. FIG. 32 shows an example User Interface of Data Extraction. As can be seen in the figure, the contact related information is extracted using the 'Contact Info' template. The fields, which can be extracted, are shown in the left hand side. In step S906, the user can extract data in many of the conventional ways, for example, by drag and drop operation, of the relevant information be it text or image to the field to which data needs to be extracted, for e.g., the map information onto Memo field or by selecting the relevant information and then pressing the relevant button to signify that the selected information needs to be extracted, for e.g., by selecting the Telephone number and then clicking on the 'Tel' button on the left hand side or by selecting the information and choosing from the right click pop-up menu to select the field to which the data needs to be extracted. Step S909 is executed, wherein a check is made to determine if Act is AutoExtract. If so, AutoExtract is executed in step S910, details of which are explained in FIG. 10 and process moves to step S908. If not, a check is made in step S911 to determine if Act is Clear All or Create New, in which step S912 is executed, wherein all the fields are cleared and moves to step S908. If not, a check is made in step S913 to determine if the Act is Save, in which case the process returns, otherwise it just loops back to step S905.

Figure 10:
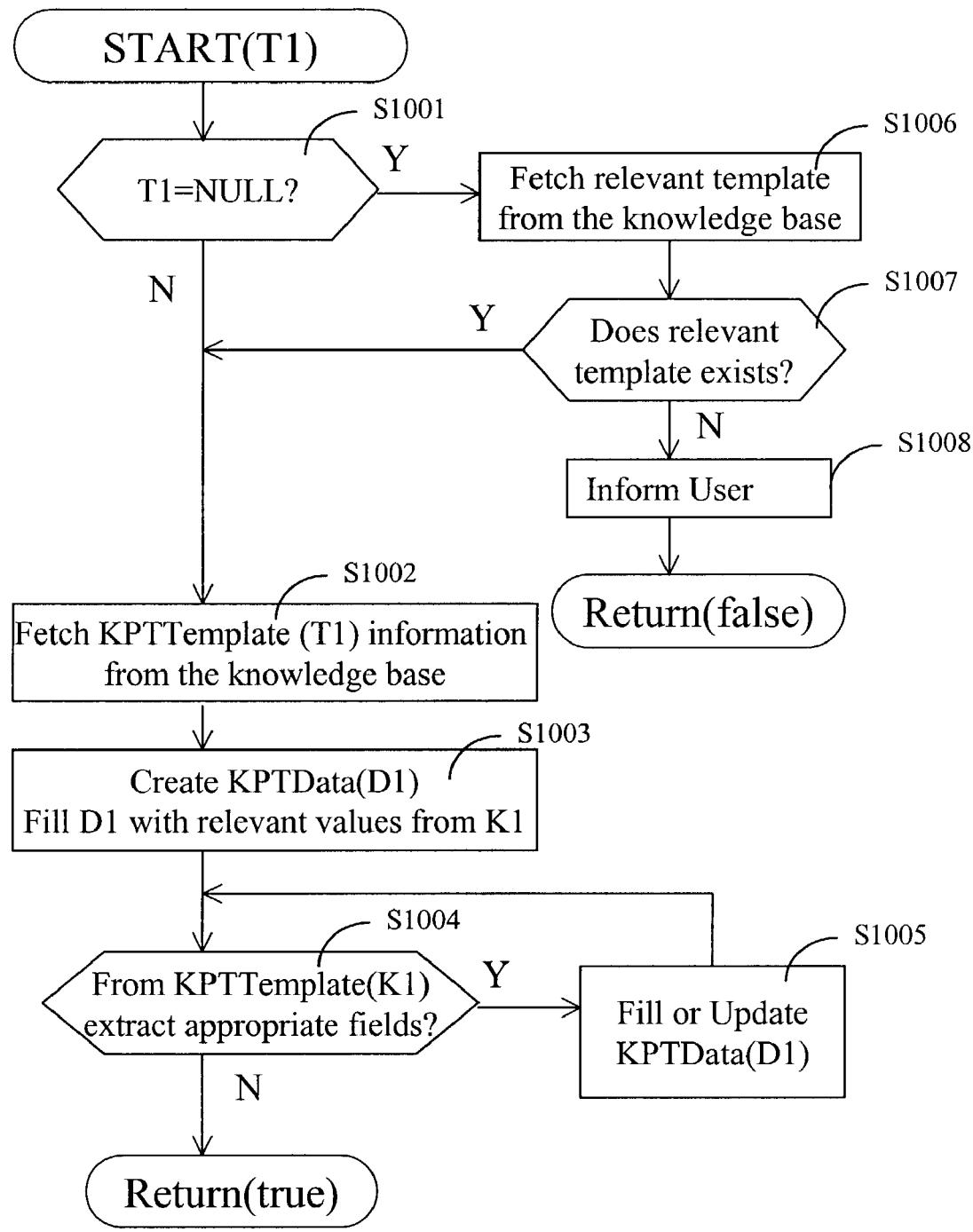
FIG. 10 is a flowchart of the procedural steps of AutoExtract.
Figure 11:
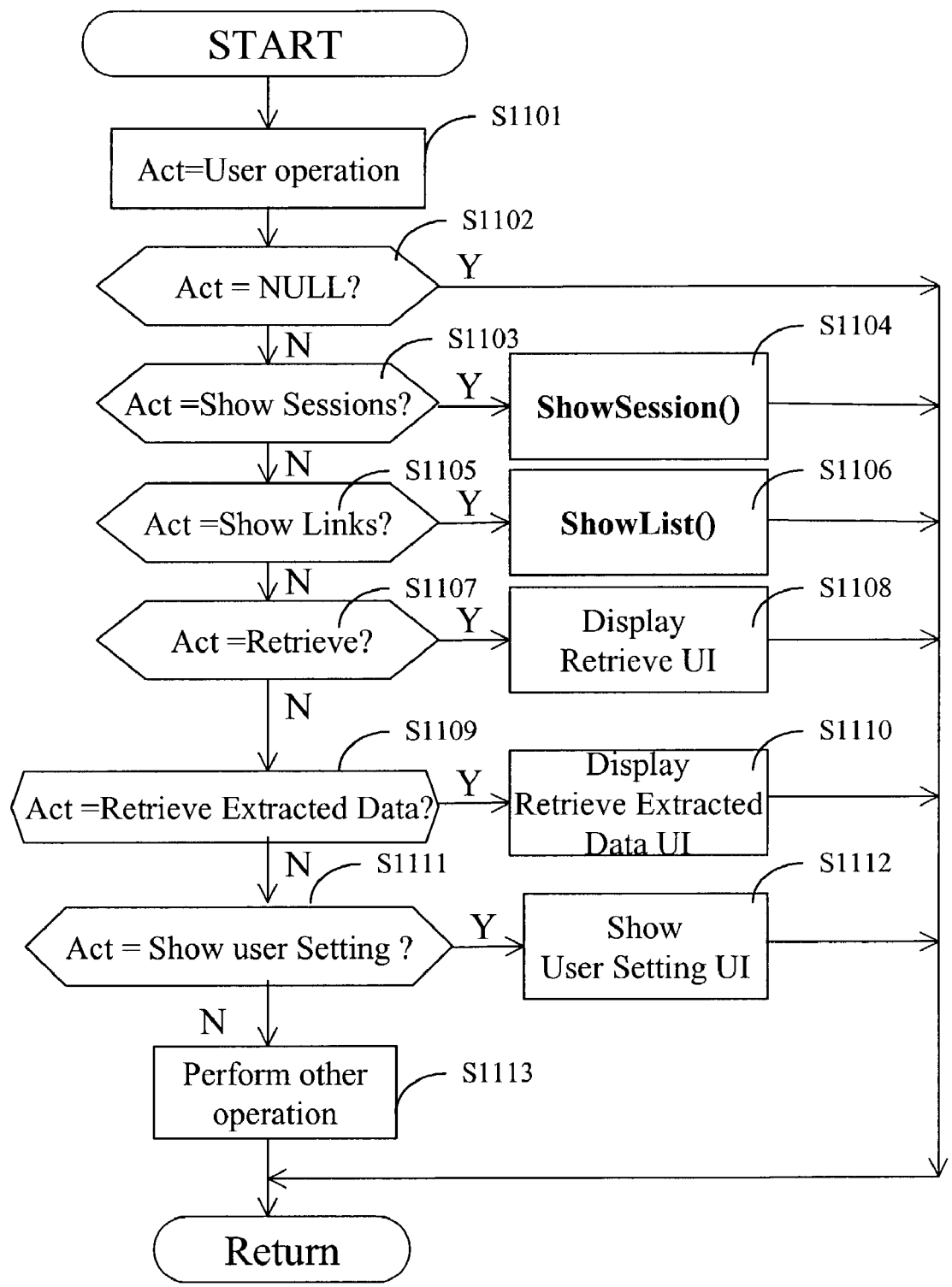
FIG. 11 is a flowchart of the procedural steps of Mgmt.

FIG. 10 is a flowchart of the procedural steps of S710 AutoExtract. A check is made in step S1001, to determine if the input Template T1 is NULL or not. If not, step S1006 is executed, wherein a relevant template is fetched from the knowledge base by matching the templates and finding the closest match template for the given input. If a template does not exist, the user is informed in step S1008 and the process returns false, indicating that the Auto extraction could not be performed. In T1 is null or a matching template exists then, step S1002 is executed wherein, the information associated to the template, knowledge sructure KPTTemplate T1 is fetched from the knowledge base. In step S1003, the knowledge structure KPTData D1, is created and D1 is filled with relevant values from K1. In step S1004 all the matching fields are automatically extracted one by one from the template information and the knowledge structure KPTData D1, is updated in step S1005, till no more fields can be extracted, in which case the process returns true. In FIG. 32, the user can perform automatic extraction by pressing the AutoExtract button. The system then scans the information on the right hand side and based on predefined or user defined rules, automatically extracts the relevant data.

FIG. 11 is a flowchart of the procedural steps of S714 Mgmt. In step S1101, the action performed by the user is set to Act and a check is made in step S1102, to determine if Act is NULL, in which case the process returns. Otherwise a check is made in step S1103, to determine if the Act is ShowSessions. If so, ShowSession( ) as explained later, to display the extracted data in time sorted order, is executed in step S1104 and the process returns. If not, a check is made in step S1106 to determine if the Act is Show Links. If so, ShowLinks( ) as explained later, to display the contents of extracted data in user specified parameter, is executed in step S1106 and the process returns. If not, a check is made in step S1107 to determine whether Act is Retrieve. If Act is retrieve, the process proceeds to step S1108 where RetrieveUI is displayed and process returns. If not, a check is made in step S1109 to determine whether Act is Retrieve Extracted Data. If Act is Retrieve Extracted Data, the process proceeds to step S1110 where in the Retrieve Extracted Data UI is displayed and process returns. If not, a check is made in step S1111 to determine whether Act is Show User Settings. If Act is Show User Settings, the process proceeds to step S1112 wherein the user settings UI is displayed, which let the user to customize the system. If not, any other operation, which needs to be performed by the embodiment, is performed in step S1113 and the process returns.

Figure 12:
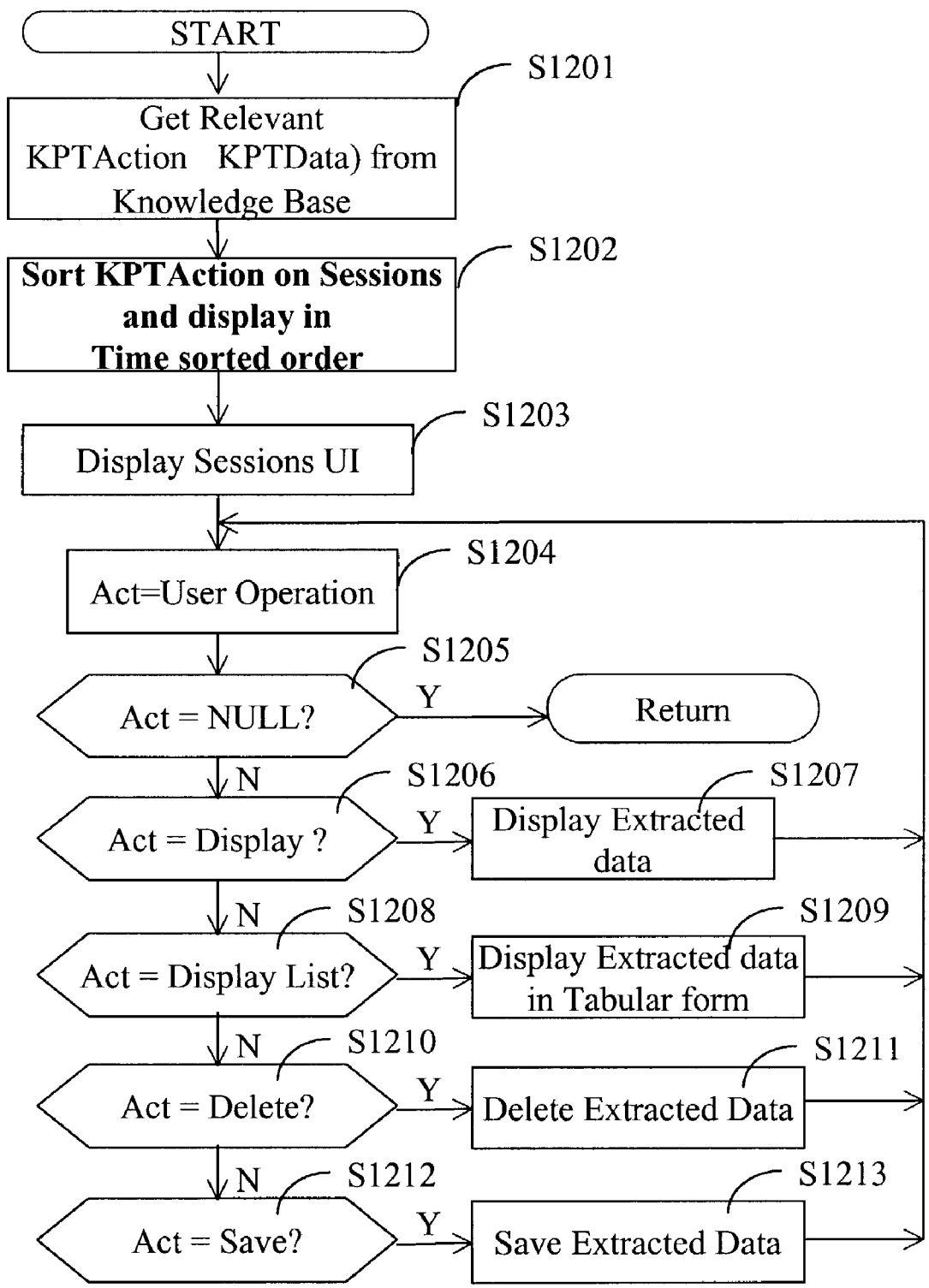
FIG. 12 is a flowchart of the procedural steps of ShowSession.
Figure 36:
FIG. 36 shows an example User Interface of Retrieval by Show Sessions.

FIG. 12 is a flowchart of the procedural steps of S1104 ShowSession of this embodiment. In step S1201, wherein based on either User settings and/or interaction and/or input and/or System settings, the relevant KPTAction and the associated KPTData are got from Knowledge Base. In step S1202, KPTAction is sorted for each session by time and displayed as Session UI in step S1203. The action performed by the user is then obtained in step S1204, wherein the Act is set to the user action performed. A check is made in step S1205 to determine if the Act is NULL, in which case the process returns, otherwise, a check is made in step S1206 to determine if the Act is Display, in which case step S1207 is executed, wherein the extracted information is displayed and the process loops back to S1204 to wait for further user action. Otherwise, a check is made in step S1208 to determine if the Act is Display List, in which case step S1209 is executed, wherein the extracted information is displayed in Tabular form and the process loops back to S1204 to wait for further user action. Otherwise, a check is made in step S1210 to determine if the Act is Delete, in which case step S1211 is executed, wherein the selected extracted information is deleted and the process loops back to step S1204. Otherwise, a check is made in step S1212 to determine if the Act is Save, in which case step S1213 is executed, wherein all the extracted information is saved to the knowledge base and the process loops back to step S1204, which waits for the user action. FIG. 36 shows an example User Interface of Retrieval by Show Sessions. As can be seen from the figure, information extracted is sorted and shown grouped on the time order, i.e., when the user performed the actual extraction operation.

Figure 13:
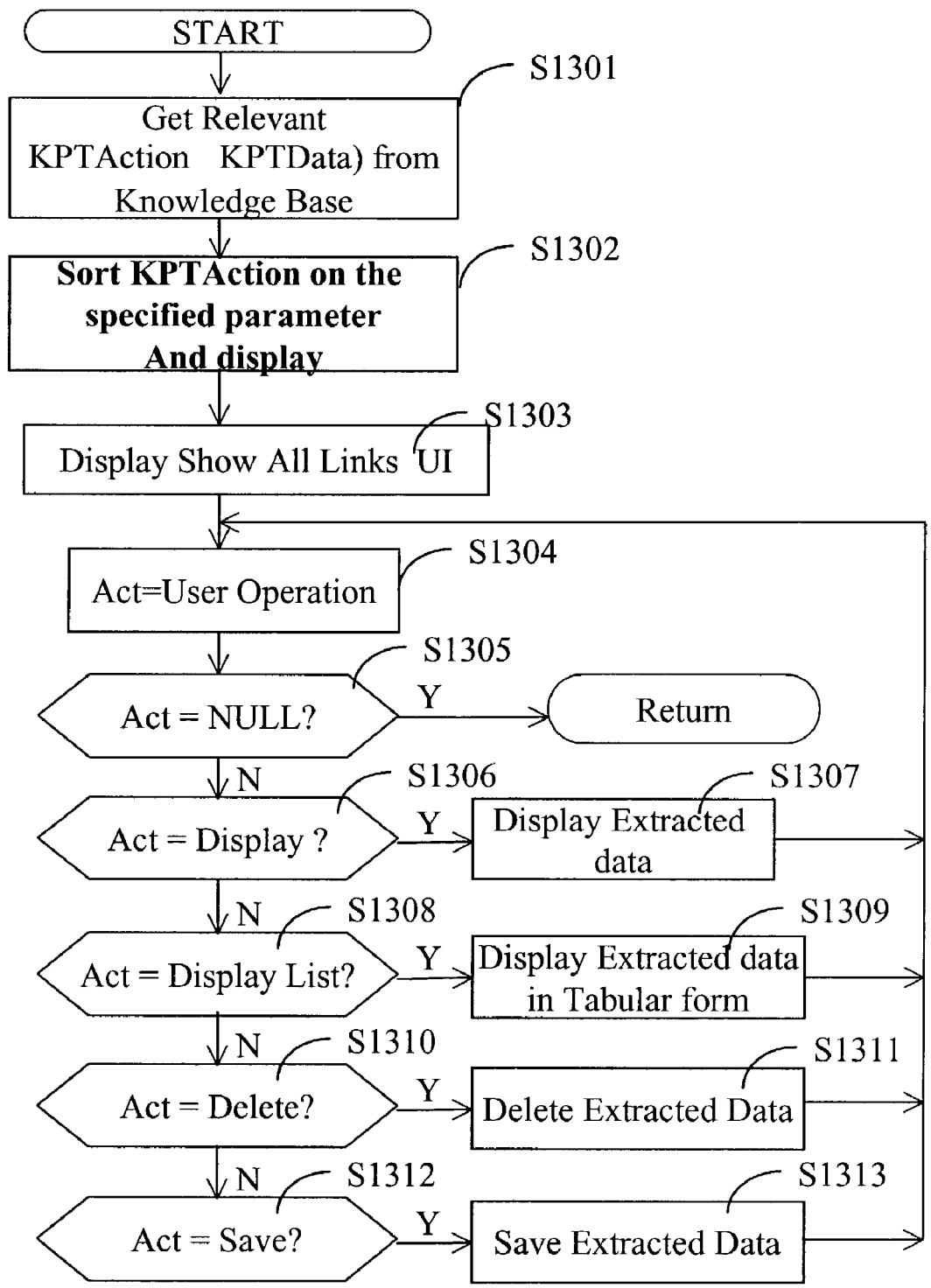
FIG. 13 is a flowchart of the procedural steps of ShowLinks.

FIG. 13 is a flowchart of the procedural steps of S1106 ShowLinks. In step S1301, wherein based on either User settings and/or interaction and/or input and/or System settings, the relevant KPTAction and the associated KPTData are got from Knowledge Base. In step S1302, KPTAction is sorted for each session based on the specified parameter displayed as Show All Links UI in step S1303. The action performed by the user is then obtained in step S1304, wherein the Act is set to the user action performed. A check is made in step S1305 to determine if the Act is NULL, in which case the process returns, otherwise, a check is made in step S1306 to determine if the Act is Display, in which case step S1307 is executed, wherein the extracted information is displayed and the process loops back to S1304 to wait for further user action. Otherwise, a check is made in step S1308 to determine if the Act is Display List, in which case step S1309 is executed, wherein the extracted information is displayed in Tabular form and the process loops back to S1304 to wait for further user action. Otherwise, a check is made in step S1310 to determine if the Act is Delete, in which case step S1311 is executed, wherein the selected extracted information is deleted and the process loops back to step S1304. Otherwise, a check is made in step S1312 to determine if the Act is Save, in which case step S1313 is executed, wherein all the extracted information is saved to the knowledge base and the process loops back to step S1304, which waits for the user action. FIGS. 39 & 40 show example User Interfaces of Retrieval by Show all Links. As can be seen from the figure, the extracted information is sorted based on destination and by selecting on a particular node, the details of the extracted information are shown on the right hand side. FIG. 40 shows an example User Interface for displaying data in tabular form in step S1309. All the relevant extracted information for a particular node is shown in tabular form. As can be seen from this figure, all the airtickets to Dallas FortWorth are tabulated and shown, thus eliminating the need to view each of the node and also makes comparison among the fares easier.

Figure 14:
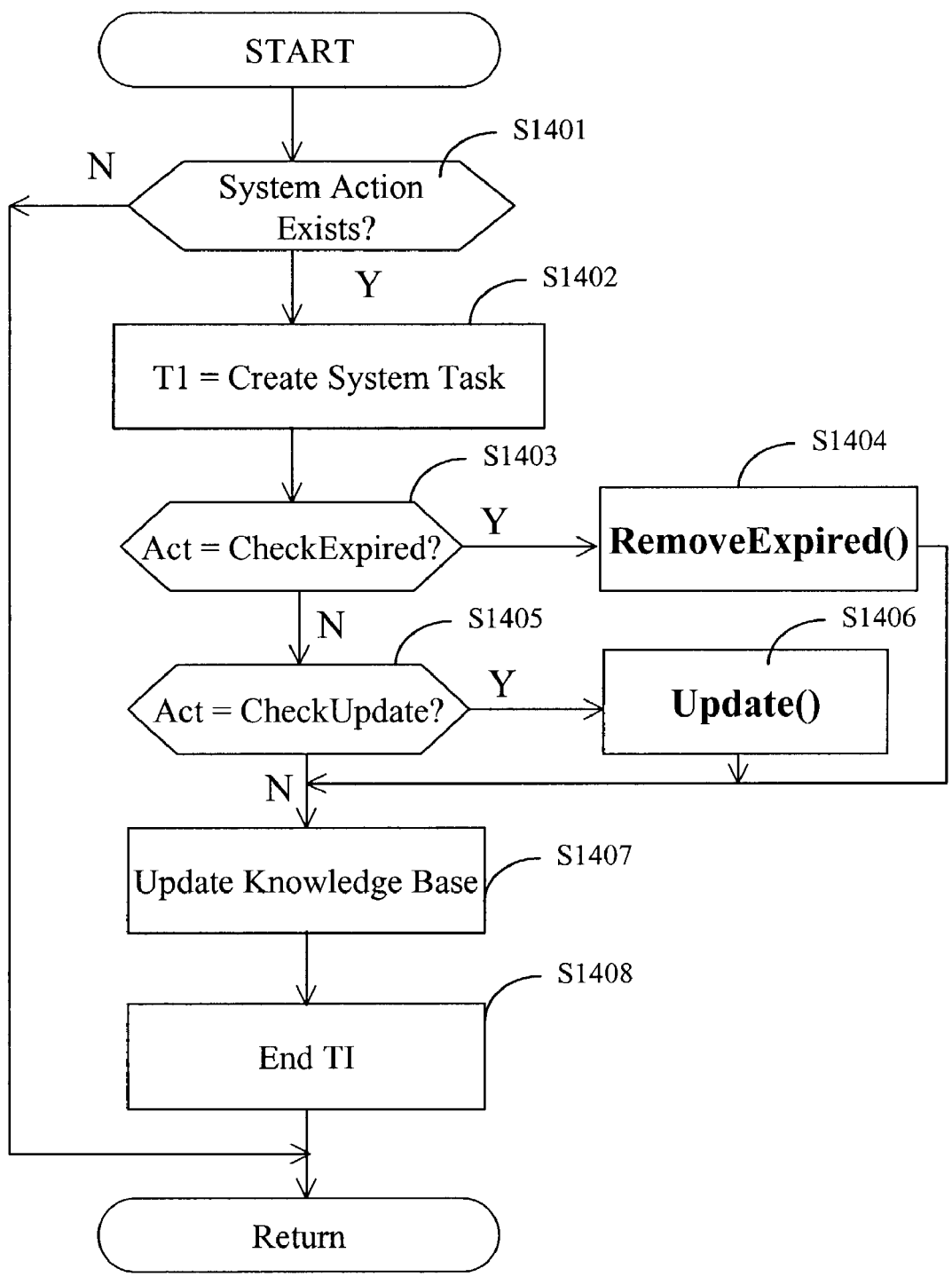
FIG. 14 is a flowchart of the procedural steps of SystemTask.

FIG. 14 is a flowchart of the procedural steps of S607 of this embodiment, in which a check is made to see if any system task needs to be executed. In step S1401, a check is made to determine if any system action exists, which needs to be executed. If no such action exists, the process is terminated and returns. If system action exists, system task T1 is created in step S1402. A check is made in step S1403 to determine if the system action is CheckExpired. If so, RemoveExpired is executed in step S21404 to remove the information whose validity period has expired. If not, a check is made in step S1405 to determine if the system action is CheckUpdate. If so, Update is executed in step S1406 to update the version of the system. After the completion of the above steps, knowledge base is updated in step S1407 and system task T1 is terminated in step S1408 and the process returns.

Figure 15:
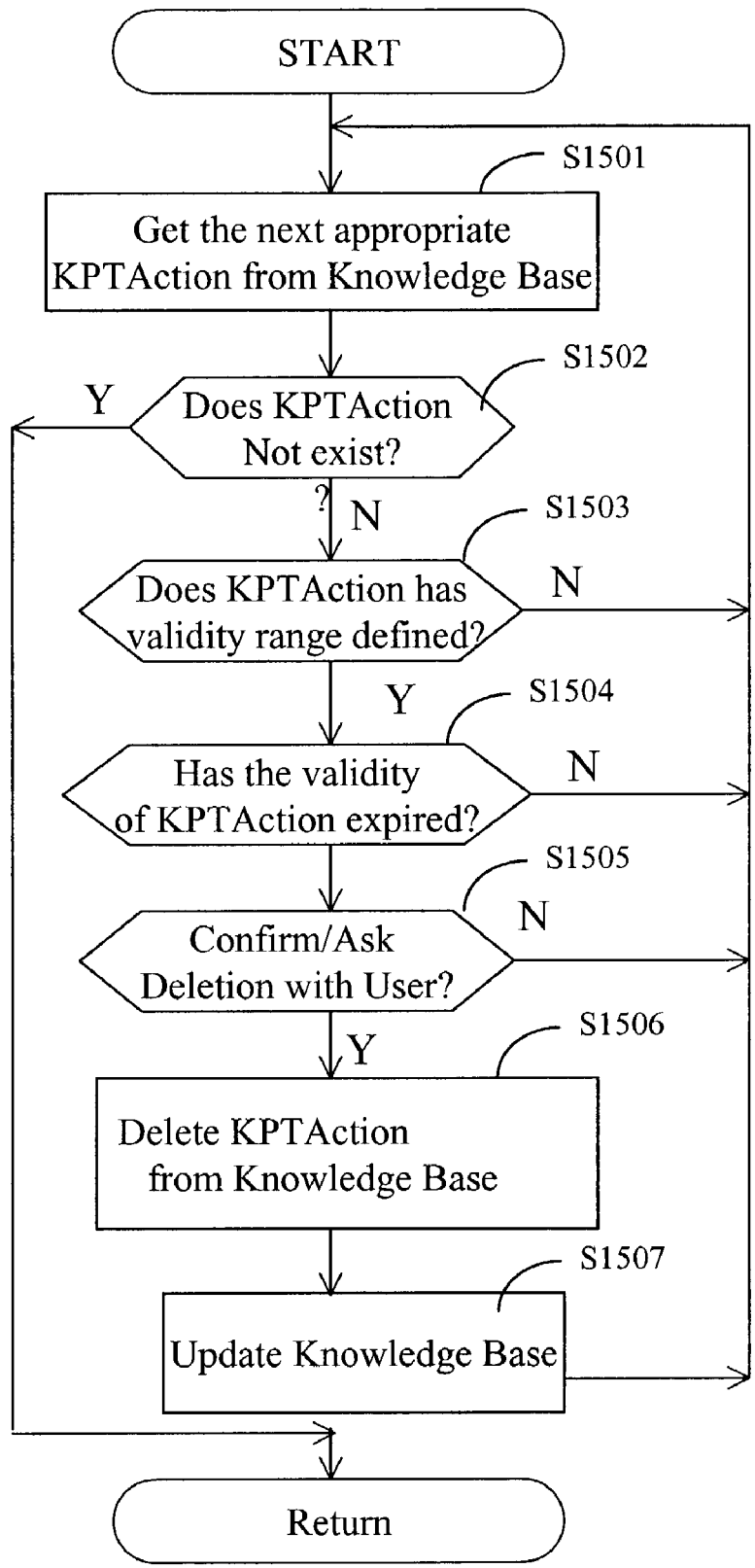
FIG. 15 is a flowchart that procedural steps of RemoveExpired.

FIG. 15 is a flowchart of the procedural steps of Remove-Expired S1404 of this embodiment. Referring to the figure, in step S1501, a valid or active KPTAction is fetched from the knowledge base. In step S1502, a check is made to determine if no KPTAction was found in the previous step. If so, the process terminates and returns. If not, a check is made in step S1503 to determine if the validity period of the KPTAction is defined. If not, the control goes back to step S1502 to fetch the next valid or active KPTAction from the knowledge base and the process continues. If so, a check is made in step S1504 to determine if the validity period of the KPTAction has expired. If not, the control goes back to step S1501 otherwise, a confirmation is made to the user or based on user settings without asking the user every time, to verify if the found action can be deleted, in step S1505. If so, in step S1506 the KPTAction and the associated information is deleted from the knowledge base and in step S1507 the knowledge base is updated and the control goes back to step S1501 to fetch the next valid or active KPTAction from the knowledge base and the process continues till no more actions are found.

Figure 16:
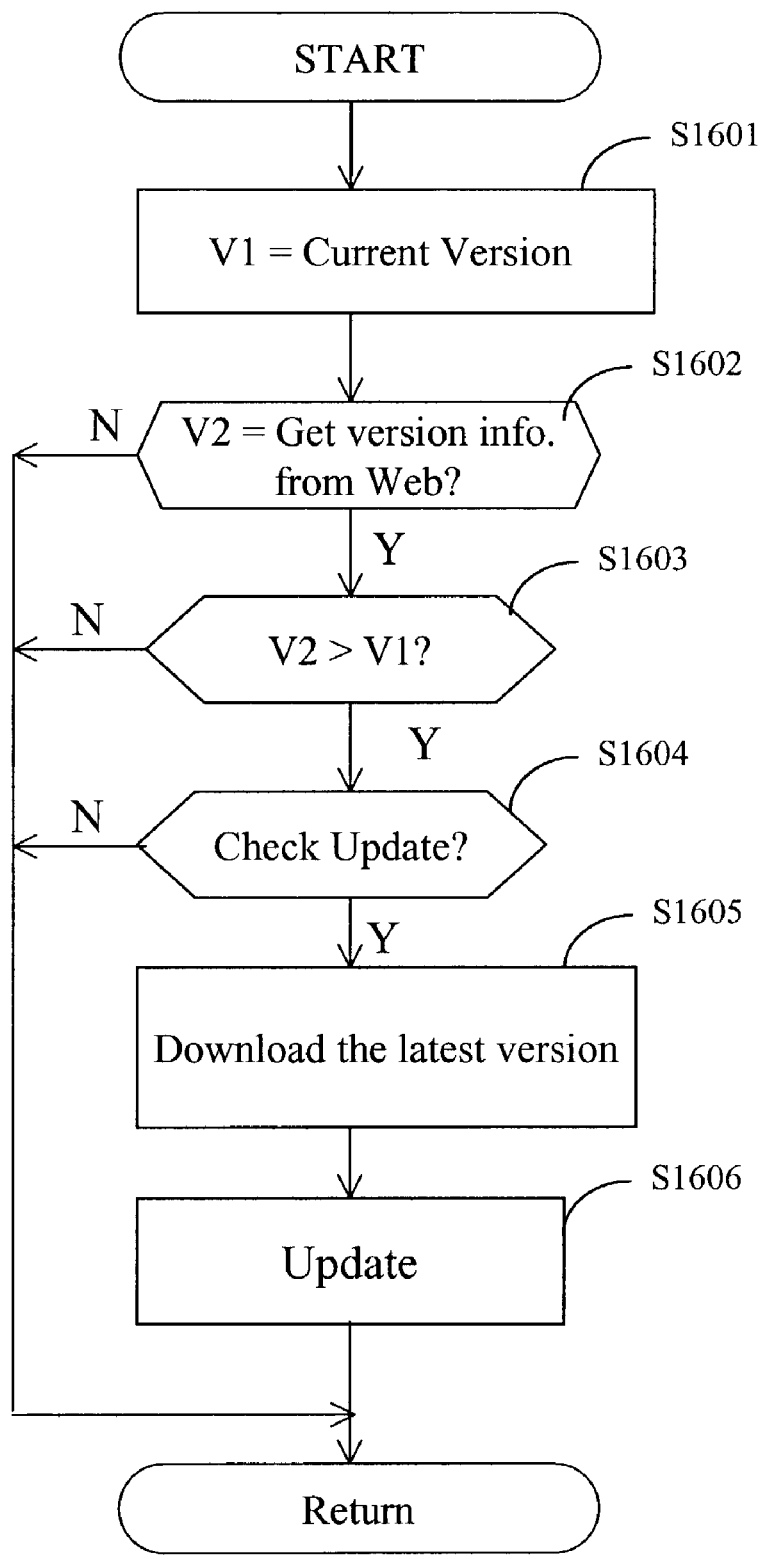
FIG. 16 is a flowchart of the procedural steps of Update.

FIG. 16 is a flowchart of the procedural steps of Check-Update S1406 of this embodiment. In step S1601, the current version of the system, V1 is obtained. In step S1602 a check is made to determine if the version V2 can be obtained from the website. If not, the process terminates and returns. If so, a check is made to determine if version V2 is greater than V1. If not, the process terminates and returns. If so, a check is made in step S1604, to see if user confirmation is required, in which case after confirming from the user, the latest version is downloaded in step S1605 and the system updates itself in step S1606 and the process returns.

Figure 17:
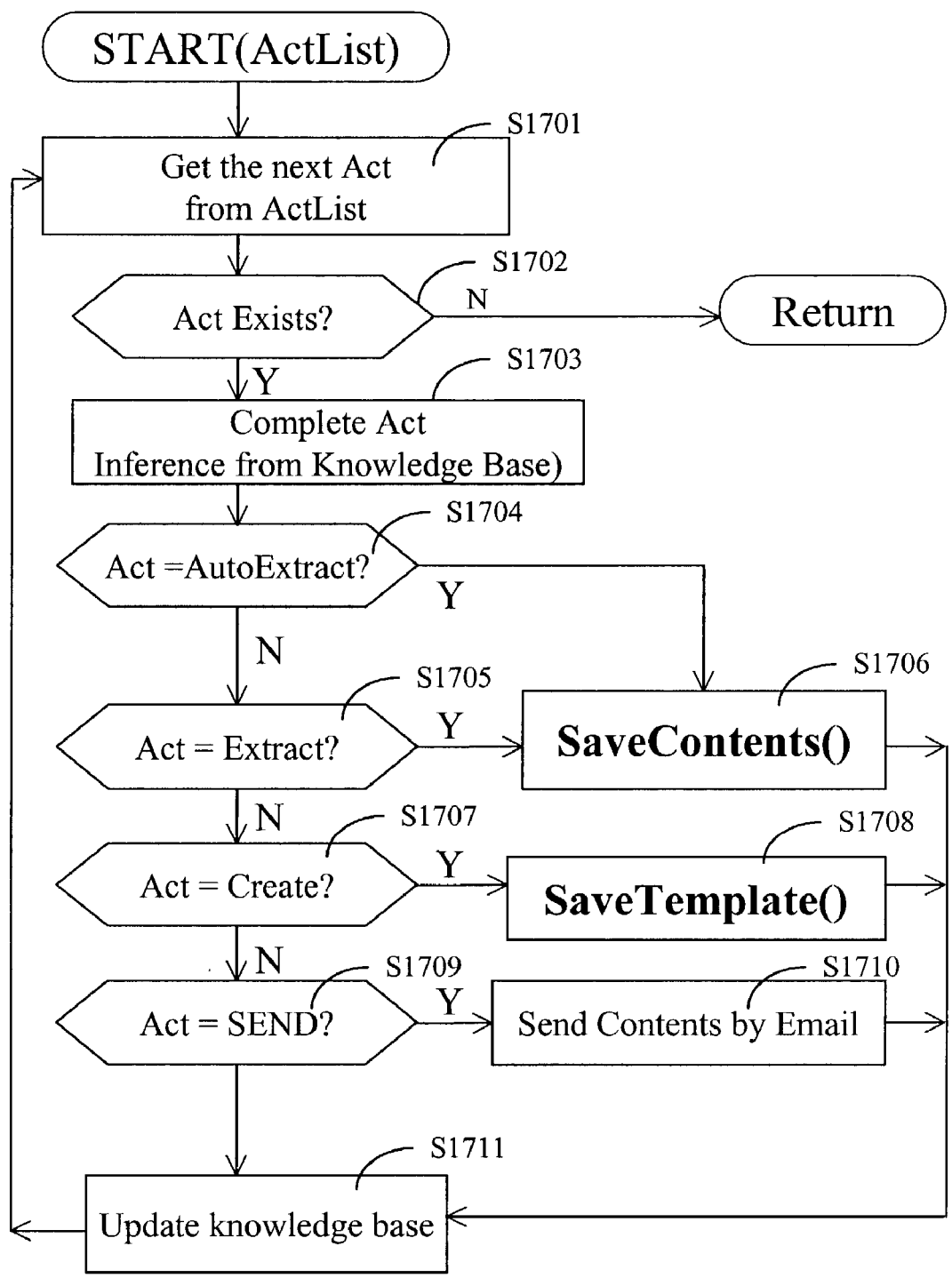
FIG. 17 is a flowchart of the procedural steps of ExecuteAction.
Figure 18:
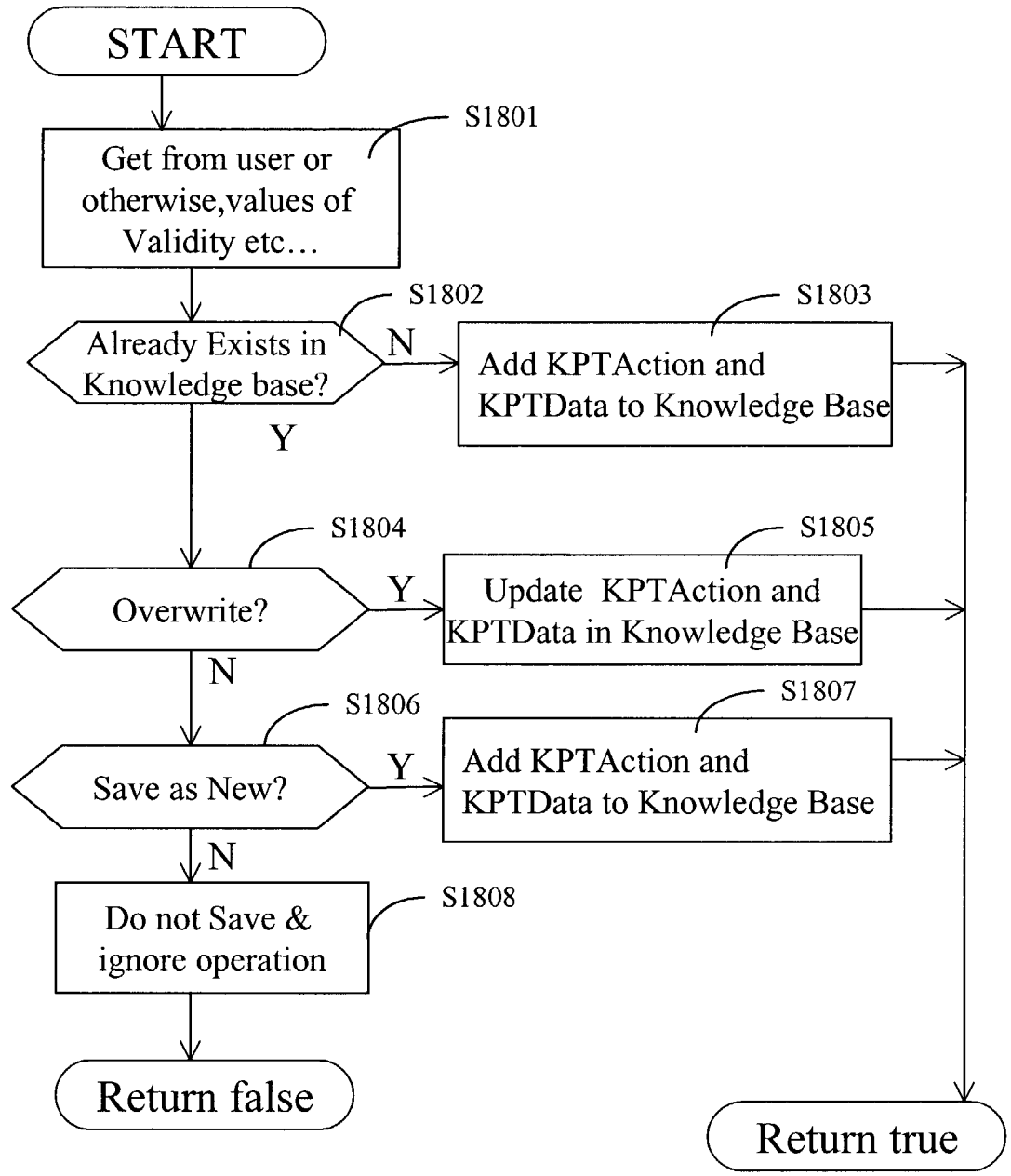
FIG. 18 is a flowchart of the procedural steps of SaveContents.
Figure 19:
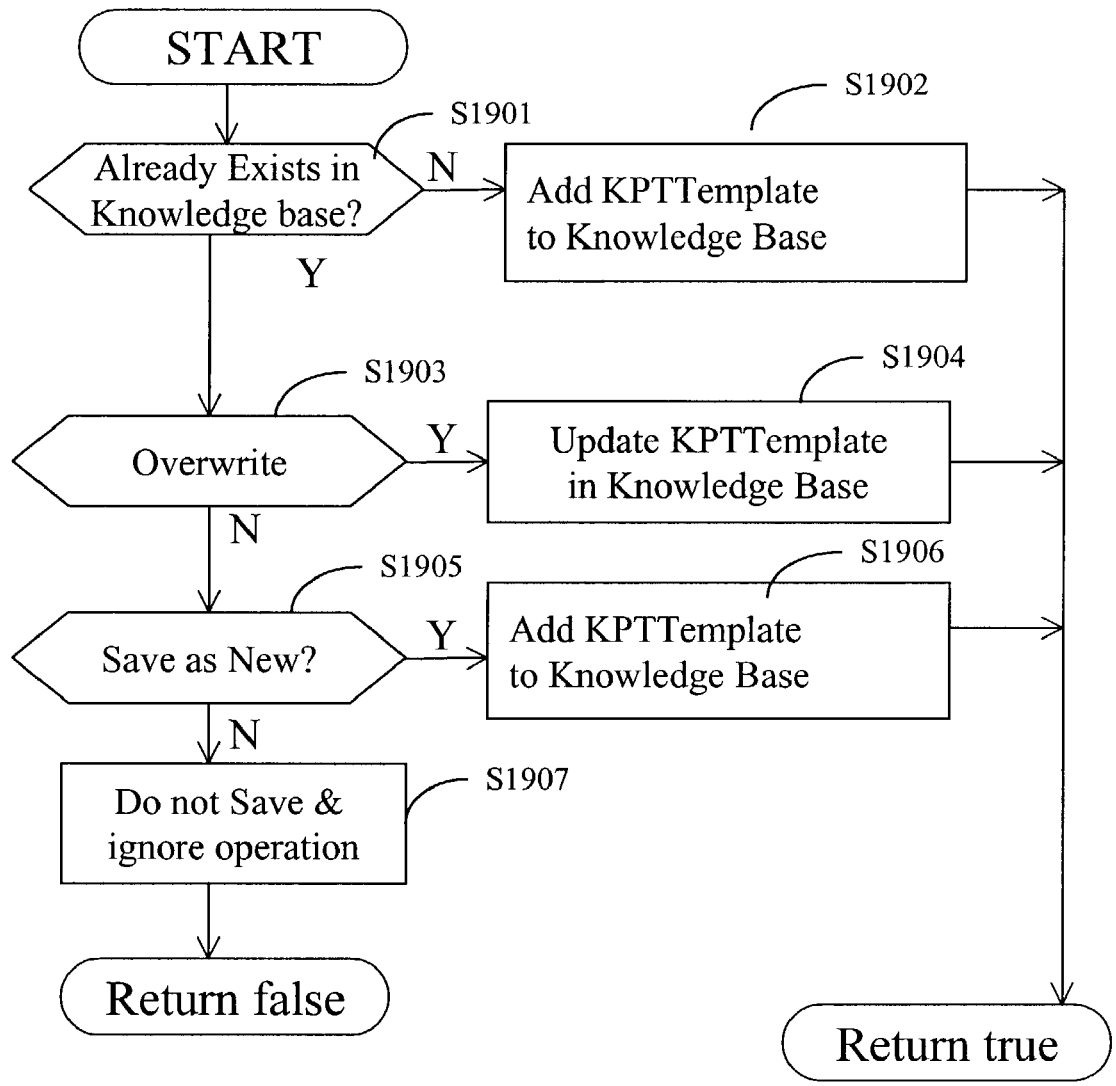
FIG. 19 is a flowchart of the procedural steps of SaveTemplate.

FIG. 17 is a flowchart of the procedural steps of Execute-Action of this embodiment. In step S1701, the next Act is got from the ActList. In step S1702, a check is made to determine if Act exists. If not, the process returns. Otherwise, in step S1703 inference is made using the knowledge base to complete the Act. A check is made in step S1704 to determine if Act is AutoExtract. If so, step S1706, SaveContents( ) as explained later in FIG. 18 is executed and goes to step S1706 wherein the knowledge base is updated and the process returns to step S1701 to fetch the next action from the ActList, till there are no more action left to be processed, at which stage the process returns. If not, a check is made in step S1705, to determine if Act is Extract. If so, step S1706, SaveContents( ) as explained later is executed and goes to step S1706 wherein the knowledge base is updated and the process returns to step S1701. A check is made in step S1707 to determine if Act is Create. If so, step S1708, SaveTemplate( ) as explained later in FIG. 19 is executed and goes to step S1706 wherein the knowledge base is updated and the process returns to step S1701 to fetch the next action. A check is made in step S1709 to determine if Act is Send. If so, step S17019, is executed, wherein the contents of the mail are sent using the messaging system and goes to step S1706 wherein the knowledge base is updated and the process returns to step S1701 to fetch the next action from the ActList, till there are no more action left to be processed, at which stage the process returns.

FIG. 18 is a flowchart of the procedural steps of S1706 SaveContents of this embodiment. In step S1801, if necessary, the relevant values for various parameters of saving the information like validity or till when the information needs to be saved etc . . . are obtained. A check is made in step S1802, to determine if the information already exists in the Knowledge base. If not, the knowledge structures KPTAction, KPTData are added to the knowledge base in step S1803 and the process returns true. If not, a check is made in step S1804, to determine if the existing information needs to be overwritten in the Knowledge base. If so, the knowledge structures KPTAction, KPTData are updated to the knowledge base in step S1805 and the process returns true. Otherwise a check is made in step S1806, if the information needs to be saved as new. If so, the knowledge structures KPTAction, KPTData are added to the knowledge base in step S1807 and the process returns true. Otherwise, step S1808 is executed wherein the save operation is ignored the process returns false.

FIG. 19 is a flowchart of the procedural steps of S1708 SaveTemplate of this embodiment. A check is made in step S1901, to determine if the information already exists in the Knowledge base. If not, the knowledge structures KPTTemplate is added to the knowledge base in step S1802 and the process returns true. If not, a check is made in step S1903, to determine if the existing information needs to be overwritten in the Knowledge base. If so, the knowledge structures KPTTemplate are updated to the knowledge base in step S1904 and the process returns true. Otherwise a check is made in step S1905, if the information needs to be saved as new. If so, the knowledge structure KPTTemplate is added to the knowledge base in step S1906 and the process returns true. Otherwise, step S1808 is executed wherein the save operation is ignored the process returns false.

Figure 20:
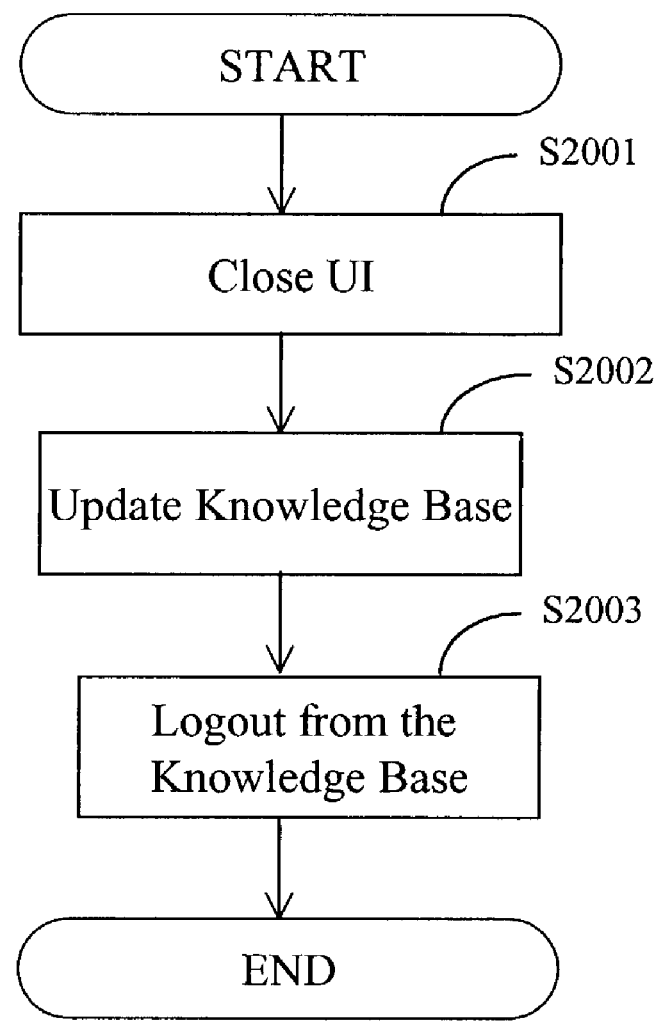
FIG. 20 is a flowchart of the procedural steps of TERMINATE.

FIG. 20 is a flowchart of the procedural steps of TERMINATE of step S403 of this embodiment. In step S2001, the UI on display are closed. In step S2002, Knowledge base is updated. The login user is logged out of the knowledge base in step S2003 and the process ends.

FIG. 21 shows an example of the knowledge structures in the knowledge base. (a), (b), (c) are the knowledge structure definitions for KPTConcept, KPTPerson and KPTDocument respectively.

FIG. 22 shows an example of the knowledge structures in the knowledge base. (a), (b) are the knowledge structure definitions for KPTAction and KPTContent respectively.

FIG. 23 shows an example of the knowledge structures in the knowledge base. (a), (b) are the knowledge structure definitions for KPTTemplate and KPTData respectively.

FIG. 24 shows an example content of the knowledge base. (a), (b) are the example contents of KPTDoc knowledge base and KPTAction knowledge base respectively.

FIG. 25 shows an example content of the knowledge base. (a), (b) are the example contents of KPTPerson knowledge base and KPTContent knowledge base respectively.

FIG. 26 shows an example content of the knowledge base. (a), (b) are the example contents of KPTTemplate knowledge base and KPTData knowledge base respectively.

Other configurations of the system will be described below.

Figure 27:
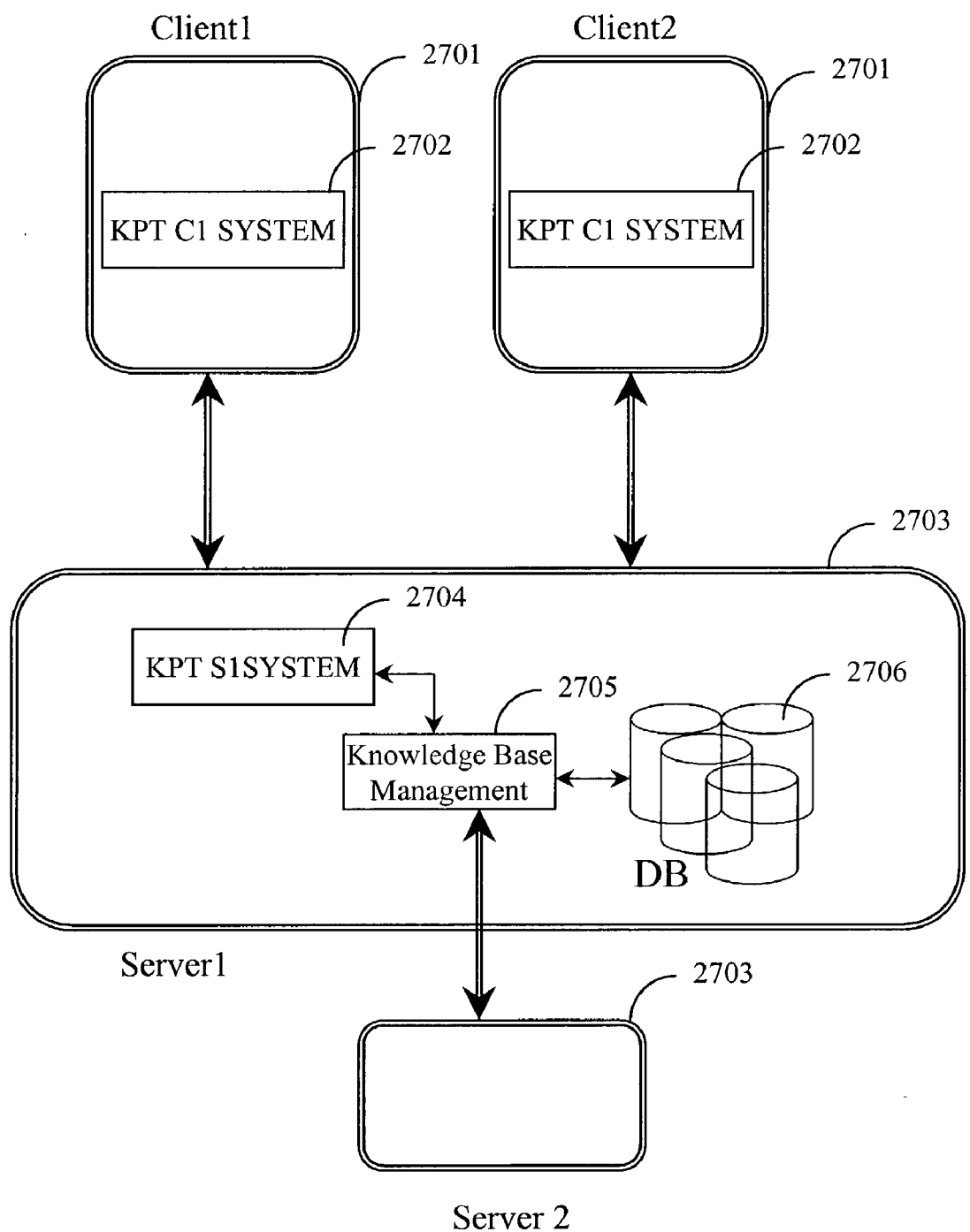
FIG. 27 shows a Client Server type implementation of this embodiment.

FIG. 27 shows a Client-Server type implementation of this embodiment. The figure illustrates an example Client-Server type implementation of embodiment of FIG. 2. Multiple clients 2701 have KPT C1 system 2702, and communicate with Server 2703. Server 2703 is equipped with KPT S1 System 2704, knowledge base management 2705 and Database 2706. Server 2703 can also communicate with other servers to access their information stored in database, via knowledge base management.

Figure 28:
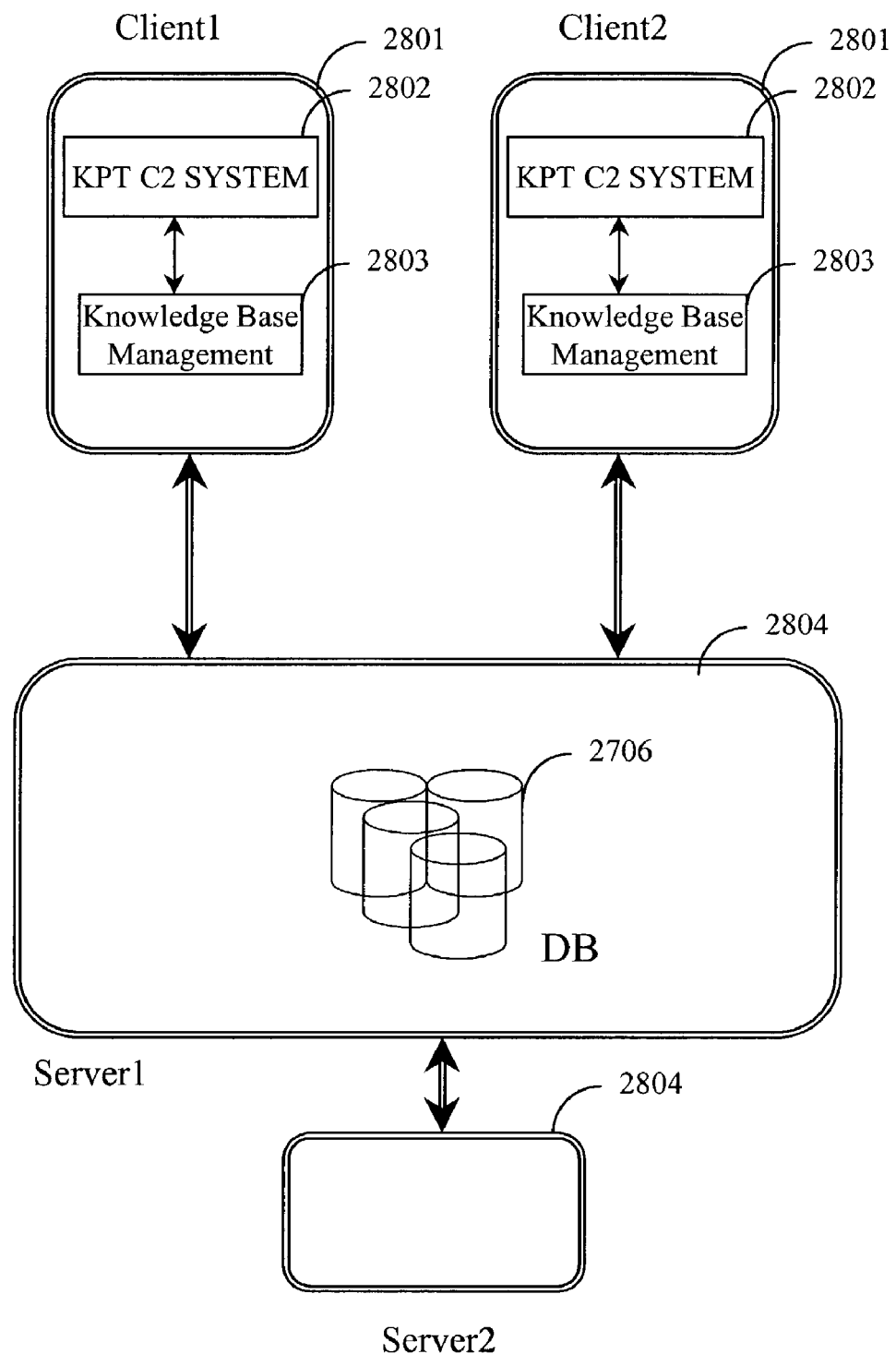
FIG. 28 shows a File Server type implementation of this embodiment.

FIG. 28 shows a File Server type implementation of this embodiment. The figure illustrates an example File Server type implementation of embodiment of FIG. 2. Multiple clients 2801 have KPT C2 System 2802, Knowledge Base Management 2803, and communicate with Server 2804. Server 2804 is equipped with Date Base 2706. Server 2804 can also communicate with other servers to access their information stored in the database. This File Server type implementation differs from the Client Server type implementation only to the fact that all the processing is done at the client side and only the database is stored on the server, thus allowing multiple clients to share the data stored on the server. The server side does not have any processing module, but for the database.

Figure 29:
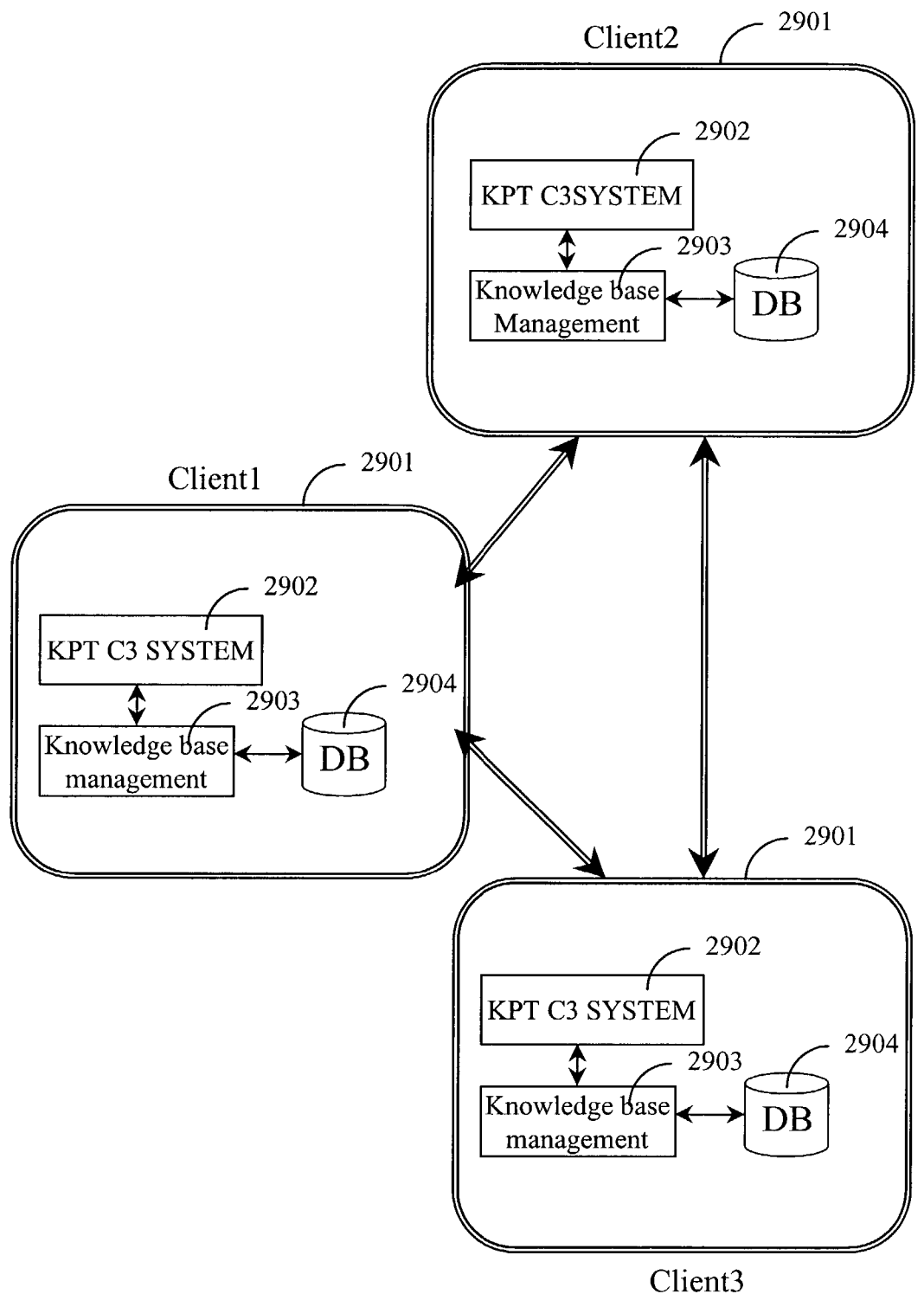
FIG. 29 shows a Distributed Clients type implementation.

FIG. 29 shows a Distributed Clients type implementation of this embodiment. The figure illustrates an example Distributed Clients type implementation of embodiment of FIG. 2. Multiple clients 2901 have KPT C3 System 2902, Knowledge Base Management 2903, Database 2904 and communicate with other clients to access their information stored in individual databases. The Distributed Clients implementation differs from the Client Server type implementation only to the fact that all the processing is done at the client side and each individual client is able to access data stored on other clients, thus allowing multiple clients to share the data stored across clients in an distributed environment.

Figure 30:
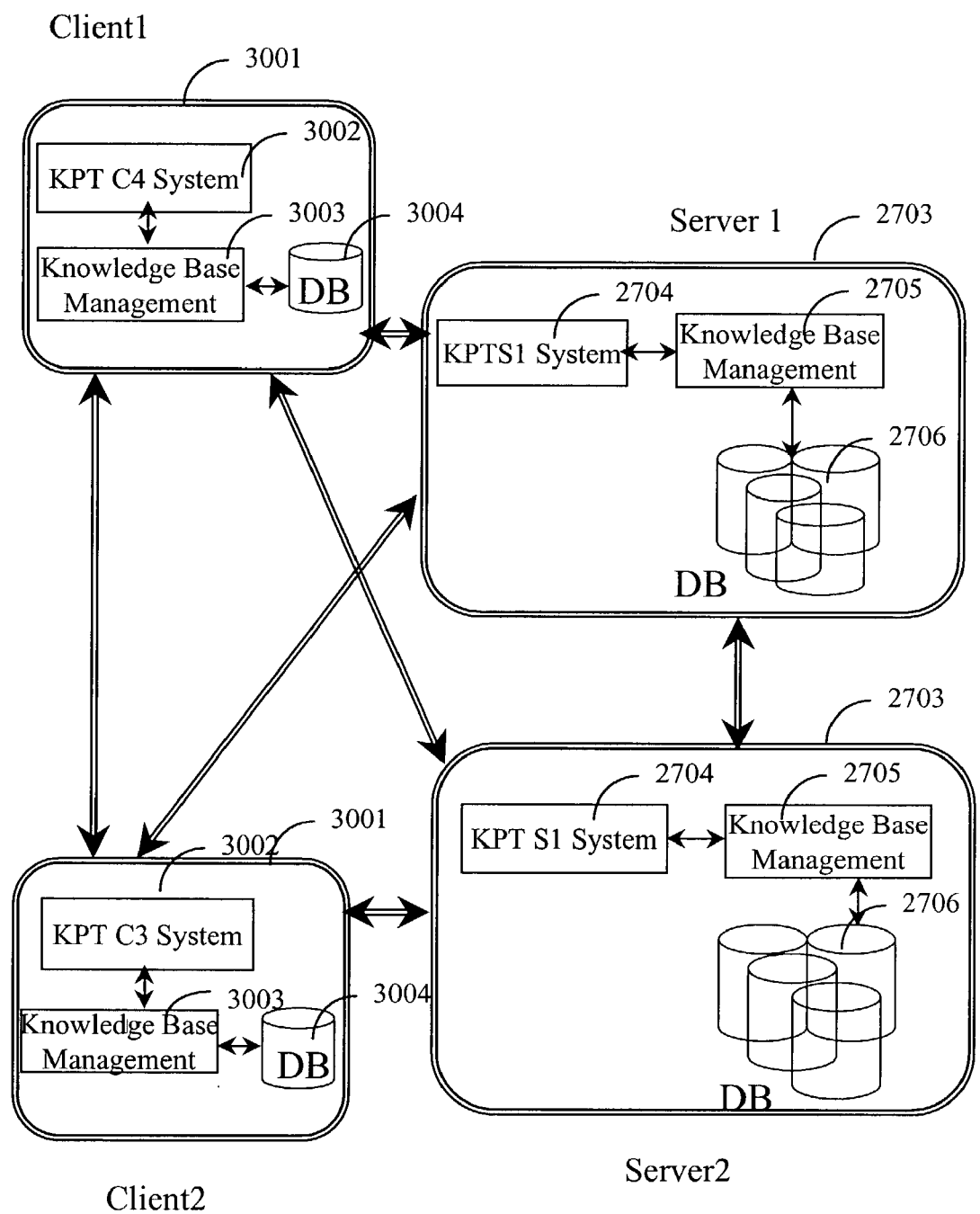
FIG. 30 shows an example mixed implementation of a File Server implementation and a Distributed Client implementation.

FIG. 30 shows an example mixed implementation in which the clients can communicate not only with server, as in a File Server implementation, but also to other clients, as in a Distributed Client implementation. As can be seen from the figure, numerous other combinations, like the client communicating with a web server based implementation, proxy server based implementation can also be implemented.

Thus it can be seen that this embodiment can also be used in traditional stand-alone architecture, client-server architecture, File-Server type of architecture, ASP architecture or any combinations thereof and it could be easily seen that it be easily extended to be implemented on other different types of architectures.

FIG. 31 shows an example User Interface of Data Extraction of this embodiment. As can be seen from the figure, for extracting the data from the right hand side of the screen, the template needs to be first selected or a entirely new one needs to be created. On the left hand side of the screen, the list of templates, both the predefined or system defined are shown along with the user defined templates. The user can create a new one by using the 'Create' button on the screen. One template needs to be selected before proceeding to the extraction process.

FIG. 32 shows another example User Interface of Data Extraction. As can be seen in the figure, the contact related information is extracted using the 'Contact Info' template. The fields, which can be extracted, are shown in the left hand side. The user can extract data in many of the conventional ways, for example, by drag and drop operation, of the relevant information be it text or image to the field to which data needs to be extracted, for e.g., the map information onto Memo field or by selecting the relevant information and then pressing the relevant button to signify that the selected information needs to be extracted, for e.g., by selecting the Telephone number and then clicking on the 'Tel' button on the left hand side or by selecting the information and choosing from the right click pop-up menu to select the field to which the data needs to be extracted. The user can also perform automatic extraction by pressing the AutoExtract button. The system then scans the information on the right hand side and based on predefined or user defined rules, automatically extracts the relevant data.

Figure 33:
FIG. 33 shows another example User Interface of Data Extraction.
Figure 34:
FIG. 34 shows another example User Interface of Data Extraction.

FIGS. 33 to 34 shows other examples of User Interface of Data Extraction. As explained previously, the necessary data, after selecting the template, which happens to be 'History Project' in the figure. All the information may be extracted from the right hand side or can be directly input by the user. For example, in FIG. 33, the Country and Validity field are input by the user directly.

Figure 35:
FIG. 35 shows an example User Interface of Retrieval by Show all Links.

FIG. 35 shows an example User Interface of Retrieval by Show all Links. As can be seen from the figure, information extracted is shown grouped by information category.

FIG. 36 shows an example User Interface of Retrieval by Show Sessions. As can be seen from the figure, information extracted is sorted and shown grouped on the time order, i.e., when the user performed the actual extraction operation.

Figure 37:
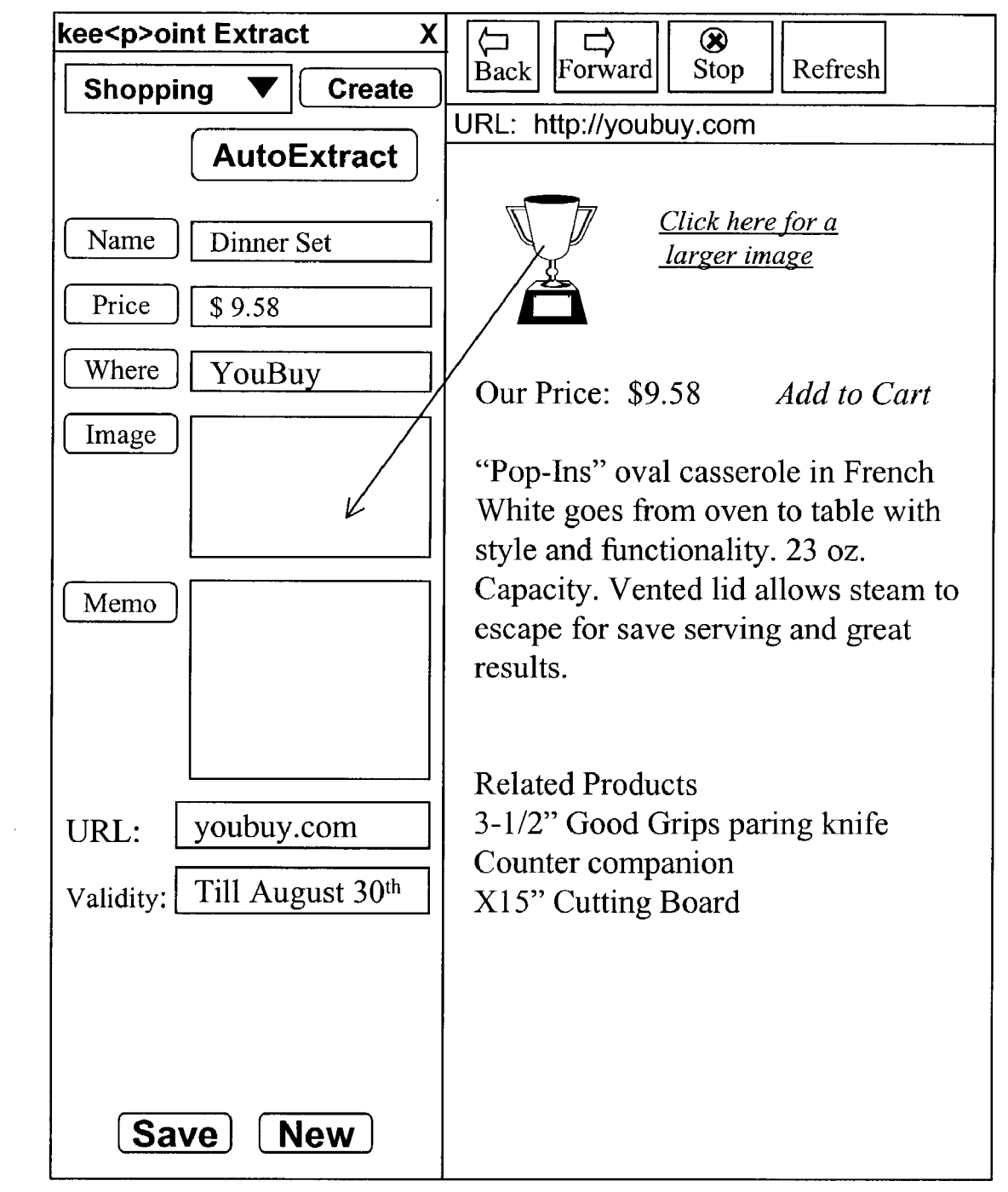

FIG. 37 to 38 show other examples of User Interface of Data Extraction. As can be seen from the figure, the information is extracted to the relevant fields either by the user or by using the AutoExtract functionality. FIG. 37 is an example of Shopping template and FIG. 38 is an example using AirTicket template. As can be seen from FIG. 38, multiple data may need to be extracted from the same information screen, for e.g., multiple choices of air tickets, which can be performed by extracting the information and using the Save functionality to update the knowledge base and to continue this process till all the necessary information has been extracted.

FIG. 39 shows another example User Interface of Retrieval by Show all Links. As can be seen from the figure, the extracted information for the given template i.e., AirTicket is sorted based on destination and by selecting on a particular node, the details of the extracted information are shown on the right hand side.

FIG. 40 shows an example User Interface of extracted data displayed in tabular form. Clicking on the List button, in FIG. 39 displays the data in tabular form, as shown in this figure. All the relevant extracted information for a particular node is shown in tabular form. As can be seen from this figure, all the airtickets to Dallas FortWorth are tabulated and shown, thus eliminating the need to view each of the node and also makes comparison among the fares easier.

FIG. 41 shows an example User Interface for Template Creation and Template Editing. As can be seen from the figure, fields can be added or removed or editing using this screen. The left hand side, displays all the fields in the current template. To add a new field, the necessary information is selected or input on the right hand side. For example, the field name, type of field—Text, Image etc . . . , default value, keywords for auto detect, position in the template—which is specified by positioning the field physically on the left hand side of the screen. The template thus created can be saved to the knowledge base using Save or deleted permanently from the knowledge base.

The present invention described above may be applied to a system constituted of a plurality of computers, or a specific computer within a system. The object of the present invention can also be achieved by supplying a storage medium storing program codes of software for implementing the function of the above embodiment to a system or an apparatus, and reading out and executing the program codes stored in the storage medium by a computer (or a CPU or MPU) of the system or apparatus. In this case, the program codes read out from the storage medium implement the function of the present invention, and the storage medium storing these program codes constitutes the invention. Also, besides the function of the above embodiment is implemented by executing the readout program codes by the computer, the present invention includes a case where an OS (Operating System) or the like running on the computer performs a part or the whole of actual processing in accordance with designations by the program codes and thereby implements the function of the above embodiment.

Furthermore, the present invention also includes a case where, after the program codes read out from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the function of the above embodiment.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. An information processing apparatus, wherein web page information is displayed by a browser, said apparatus comprising:
    template storage means for storing a plurality of templates, wherein each of the plurality of templates defines at least one attribute of data to be extracted and a data field for the attribute;
    template selection means for selecting a template from the plurality of templates stored in said template storage means;
    wherein said template selection means selects an appropriate template without requiring a selection by a user;
    extraction means for searching currently displayed web page information for data corresponding to the respective attribute defined in the template selected by said template selection means, and extracting the searched out data from the currently displayed web page information; and
    saving means for saving data extracted by said extraction means in the data field for the attribute corresponding to the extracted data, in the template selected by said template selection means.

2. An apparatus according to claim 1, further comprising template creation means for creating a template by defining at least one attribute to be extracted and adding the created template to the plurality of templates.

3. An apparatus according to claim 1, wherein said template selection means selects the template in accordance with a selection by a user.

4. An apparatus according to claim 1, wherein said template selection means selects a template containing an attribute corresponding to data in the obtained information as the appropriate template.

5. An apparatus according to claim 1, further comprising:
    template display means for displaying the template selected by said template selection means with a data field corresponding to each of the attributes; and
    extracted data display means for displaying the extracted data in the data field corresponding to the attribute of the extracted data.

6. An apparatus according to claim 1, further comprising:
    extracted data list display means for displaying a list of names of the extracted data;
    name specifying means for specifying a name in the list of names; and
    extracted data display means for displaying the extracted data corresponding to the name specified by said name specifying means.

7. An apparatus according to claim 6, wherein said extracted data list display means displays the list of names in a tree structure in accordance with layers of an item.

8. An apparatus according to claim 6, wherein said name specifying means specifies a plurality of names and said extracted data display means displays a list of extracted data corresponding to the specified names.

9. An apparatus according to claim 6, wherein said saving means saves the extracted data in correspondence with a time when the data is extracted and said extracted data list display means displays the list of names in accordance with the time when the data is extracted.

10. An apparatus according to claim 1, further comprising sending means for sending the extracted data to an addressee.

11. An information processing method for processing web page information displayed by a browser, said method comprising the steps of:
  selecting a template from a plurality of templates stored in a template memory,
    wherein each of the plurality of templates defines at least one attribute of data to be extracted and a data field for the attribute;
  wherein said template is selected without requiring a selection by a user;
  searching currently displayed web page information for data corresponding to the respective attribute defined in the selected template, and extracting the searched out data from the currently displayed web page information; and
  saving the extracted data in the data field for the attribute corresponding to the extracted data, in the selected template.

12. The method according to claim 11, further comprising creating a template by defining at least one attribute to be extracted and adding the created template to the plurality of templates.

13. The method according to claim 11, wherein said template is selected in accordance with a selection by a user.

14. The method according to claim 11, wherein said selected template contains an attribute corresponding to data in the obtained information as the appropriate template.

15. The method according to claim 11, further comprising:
  displaying the selected template with a data field corresponding to each of the attributes; and
  displaying the extracted data in the data field corresponding to the attribute of the extracted data.

16. The method according to claim 11, further comprising:
  displaying a list of names of the extracted data;
  specifying means for specifying a name in the list of names; and
  displaying the extracted data corresponding to the name specified by said name specifying means.

17. The method according to claim 16, wherein said list of names is displayed in a tree structure in accordance with layers of an item.

18. The method according to claim 16, wherein a plurality of names are specified and said list of extracted data is displayed corresponding to the specified names.

19. The method according to claim 16, wherein said extracted data is saved in correspondence with a time when the data is extracted and said list of names is displayed in accordance with the time when the data is extracted.

20. The method according to claim 11, further comprising sending the extracted data to an addressee.

21. An information processing program for controlling a computer to perform a method for processing web page information displayed by a browser, said method comprising the steps of:
  selecting a template from a plurality of templates stored in a template memory,
    wherein each of the plurality of templates defines at least one attribute of data to be extracted and a data field for the attribute;
  wherein said template is selected without requiring a selection by a user;
  searching currently displayed web page information for data corresponding to the respective attribute defined in the selected template, and extracting the searched out data from the currently displayed web page information; and
  saving the extracted data in the data field for the attribute corresponding to the extracted data, in the selected template.

22. An information processing apparatus, wherein web page information is displayed by a browser, said apparatus comprising:
  template storage means for storing a plurality of templates, wherein each of the plurality of templates defines at least one attribute of data to be extracted and a data field for the attribute;
  template selection means for selecting a template from the plurality of templates in said template storage means;
  wherein said template selection means selects an appropriate template without requiring a selection by a user;
  designation means for designating arbitrary data in currently displayed web page information in response to designation by a user;
  field selection means for selecting a data field in the template selected by said template selection means, in response to a selection by the user;
  extraction means for extracting the data designated by said designation means, from the currently displayed web page information; and
  saving means for saving the data extracted by said extraction means in the data field selected by said field selection means.

23. An apparatus according to claim 22, wherein said designation means designates the data by dragging the data by a mouse and said field selection means selects the data field by displaying the selected template and dropping the dragged data in the data field to be selected.

24. An apparatus according to claim 22, wherein said field selection means selects the data field by displaying all of the data fields in a pop up menu in response to a mouse click and selecting a data field in the menu.

25. An information processing method for processing web page information displayed by a browser, said method comprising the step of:
  selecting a template from a plurality of templates stored in a template memory,
    wherein each of the plurality of templates defines at least one attribute of data to be extracted and a data field for the attribute;
  wherein said template is selected without requiring a selection by a user;
  designating arbitrary data in currently displayed web page information in response to a designation by a user;
  selecting a data field in the selected template in response to a selection by the user;
  extracting the designated data from the currently displayed web page information; and
  saving the extracted data in the selected data field.

26. A method according to claim 25, wherein in said designation step the data is designated by dragging the data by a mouse and in said field selecting step the data field is selected by displaying the selected template and dropping the dragged data in the data field to be selected.

27. A method according to claim 25, wherein in said field selectings step the data field is selected by displaying all of the data fields in a pop up menu in response to a mouse click and selecting a data field in the menu.

28. An information processing program for controlling a computer to perform method for processing web page information displayed by a browser, said method comprising the steps of:
    selecting a template from a plurality of templates stored in a template memory,
        wherein each of the plurality of templates defines at least one attribute of data to be extracted and a data field for the attribute;
    wherein said template is selected without requiring a selection by a user;
    designating arbitrary data in currently displayed web page information in response to a designation by a user;
    selecting a data field in the selected template in response to a selection by the user;
    extracting the designated data from the currently displayed web page information; and
    saving the extracted data in the selected data field.

* * * * *